(12) United States Patent
Van der Auwera et al.

(10) Patent No.: US 11,580,672 B2
(45) Date of Patent: Feb. 14, 2023

(54) ANGULAR MODE SIMPLIFICATION FOR GEOMETRY-BASED POINT CLOUD COMPRESSION

(71) Applicant: QUALCOMM Incorporated, San Diego, CA (US)

(72) Inventors: Geert Van der Auwera, Del Mar, CA (US); Louis Joseph Kerofsky, San Diego, CA (US); Bappaditya Ray, San Diego, CA (US); Adarsh Krishnan Ramasubramonian, Irvine, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 28 days.

(21) Appl. No.: 17/224,709

(22) Filed: Apr. 7, 2021

(65) Prior Publication Data

US 2021/0327099 A1  Oct. 21, 2021

Related U.S. Application Data

(60) Provisional application No. 63/009,940, filed on Apr. 14, 2020, provisional application No. 63/007,282, filed on Apr. 8, 2020.

(51) Int. Cl.
*G06T 9/40* (2006.01)
(52) U.S. Cl.
CPC ..................... *G06T 9/40* (2013.01)
(58) Field of Classification Search
CPC combination set(s) only.
See application file for complete search history.

(56) References Cited

U.S. PATENT DOCUMENTS

2019/0103177 A1\* 4/2019 Matthews ........... G06F 21/6245
2019/0108655 A1\* 4/2019 Lasserre ................ G06T 17/00
(Continued)

OTHER PUBLICATIONS

Anton B., et al., "Hardware Accelerated Compression of LIDAR Data Using FPGA Devices", Sensors, vol. 13. No. 5. Jan. 1, 2013 (Jan. 1, 2013), pp. 6405-6422. XP055810176. DOI: 10.3390/s130506405, Retrieved from the Internet: URL: page>https://www.ncbi.nlm.nih.gov/pmc/articles/PMC3690063/pdf/sensors-13-06405.pdf, pp. 6411, paragraph 4.1.4, p. 6409, paragraph 4.1.

(Continued)

*Primary Examiner* — Ming Wu
(74) *Attorney, Agent, or Firm* — Shumaker & Sieffert, P.A.

(57) ABSTRACT

A method of decoding point cloud data comprises obtaining a bitstream that includes an arithmetically encoded syntax element indicating a vertical point position offset within a node of a tree that represents 3-dimensional positions of points in a point cloud represented by the point cloud data; and decoding the vertical point position offset, wherein decoding the vertical point position offset comprises: determining a laser index of a laser candidate in a set of laser candidates, wherein the determined laser index indicates a laser beam that intersects the node; determining a context index based on whether the laser beam is above a first distance threshold, between the first distance threshold and a second distance threshold, between the second distance threshold and a third distance threshold, or below the third distance threshold; and arithmetically decoding a bin of the vertical point position offset using a context indicated by the determined context index.

33 Claims, 17 Drawing Sheets

(56) References Cited

U.S. PATENT DOCUMENTS

| | | | |
|---|---|---|---|
| 2019/0116215 A1* | 4/2019 | Oesterreicher | H04N 21/23439 |
| 2019/0116357 A1* | 4/2019 | Tian | H04N 19/14 |
| 2021/0326734 A1 | 10/2021 | Van Der Auwera | |
| 2021/0327095 A1 | 10/2021 | Van Der Auwera et al. | |
| 2021/0327098 A1 | 10/2021 | Ray | |

OTHER PUBLICATIONS

International Search Report and Written Opinion—PCT/US2021/026388—ISA/EPO—dated Jun. 24, 2021.

ITU-T H.265: "Series H: Audiovisual and Multimedia Systems, Infrastructure of Audiovisual Services—Coding of Moving Video, High Efficiency Video Coding", The International Telecommunication Union, Jun. 2019, 696 Pages.

3DG: "G-PCC Codec Description v5", Coding of Moving Pictures and Audio, ISO/IEC JTC1/SC29/WG11, N18891, Oct. 2019, Geneva, CH, Dec. 13, 2019, 75 pages, XP030225589, Retrieved from the Internet: URL: http://phenix.int-evry.fr/mpeg/doc_end_user/documents/128_Geneva/wg11/w18891.zip w18891 docx—[retrieved on Dec. 18, 2019].

Auwera (Qualcomm) G.V.D., et al., "[GPCC] [New Proposal] Angular Mode Simplifications and HLS Refinements", 130. MPEG Meeting, Apr. 20, 2020-Apr. 24, 2020, Alpbach, (Motion Picture Expert Group or ISO/IEC JTC1/SC29/WG11), No. m53693, Apr. 15, 2020, XP030287372, 12 Pages.

Lasserre (Blackberry) S., et al., "[GPCC] [CE 13.22 Related] An Improvement of the Planar Coding Mode", 128. MPEG Meeting, Oct. 7, 2019-Oct. 11, 2019, Geneva, (Motion Picture Expert Group or ISO/IEC JTC1/SC29/WG11), No. m50642, Oct. 2, 2019, XP030221087, 3 Pages.

Lasserre (Blackberry) S., et al., "The Azimuthal Coding Mode", [GPCC][CE13.22 related], 129. MPEG Meeting, Jan. 13, 2020-Jan. 17, 2020, Brussels, (Motion Picture Expert Group or ISO/IEC JTC1/SC29/WG11), No. m51596, Jan. 8, 2020, XP030224661, 31 Pages.

Lasserre S., (Blackberry) et al., "[GPCC] [CE 13.22 ] Report on Angular Coding Mode", 129. MPEG Meeting, Jan. 13, 2020-Jan. 17, 2020, Brussels, (Motion Picture Expert Group or ISO/IEC JTC1/SC29/WG11). No. M51594, Jan. 8, 2020, XP030224657, 4 Pages.

Ray, B., (Qualcomm), et al., "[G-PCC] [new] Angular HLS Improvement and Bugfix", 131. MPEG Meeting, Jun. 29, 2020-Jul. 3, 2020, Online, (Motion Picture Expert Group or ISO/IEC JTC1/SC29/WG11), No. m54702, Jun. 23, 2020 (Jun. 23, 2020), XP030289275, 8 Pages.

Tulvan C., et al., "Use Cases for Point Cloud Compression (PCC)", 115th MPEG Meeting, May 30, 2016-Jun. 3, 2016, Geneva, CH (Motion Picture Expert Group or ISO/IEC JTC1/SC29/WG11), No. N16331, Jun. 5, 2016, XP030269821, 8 Pages.

* cited by examiner

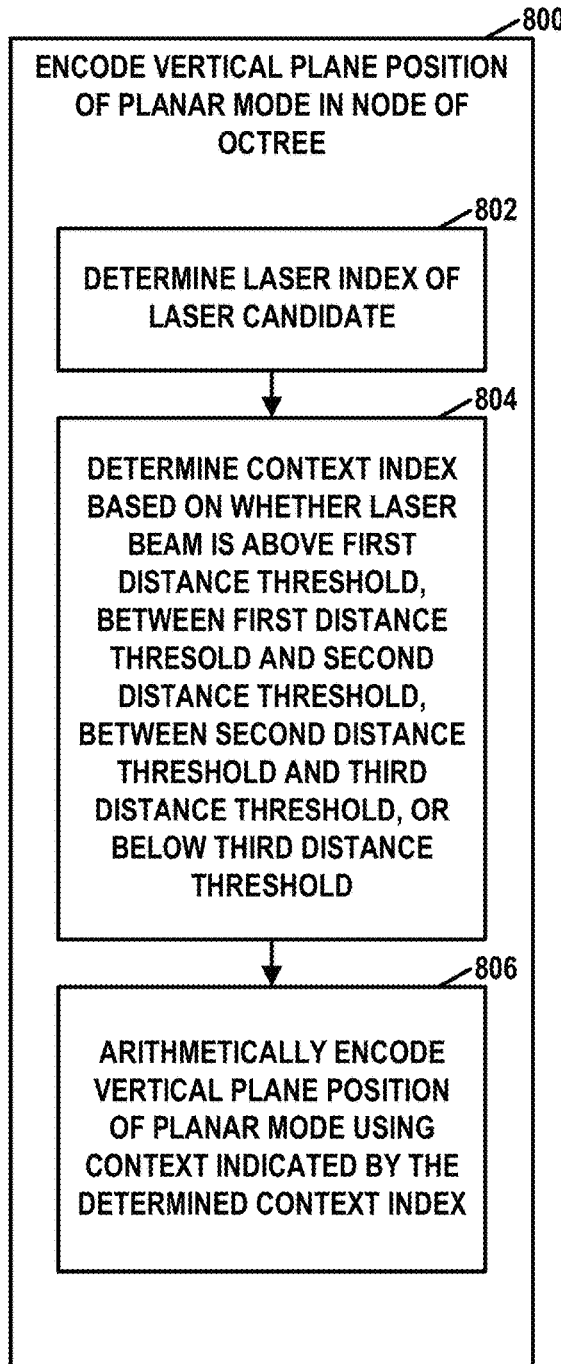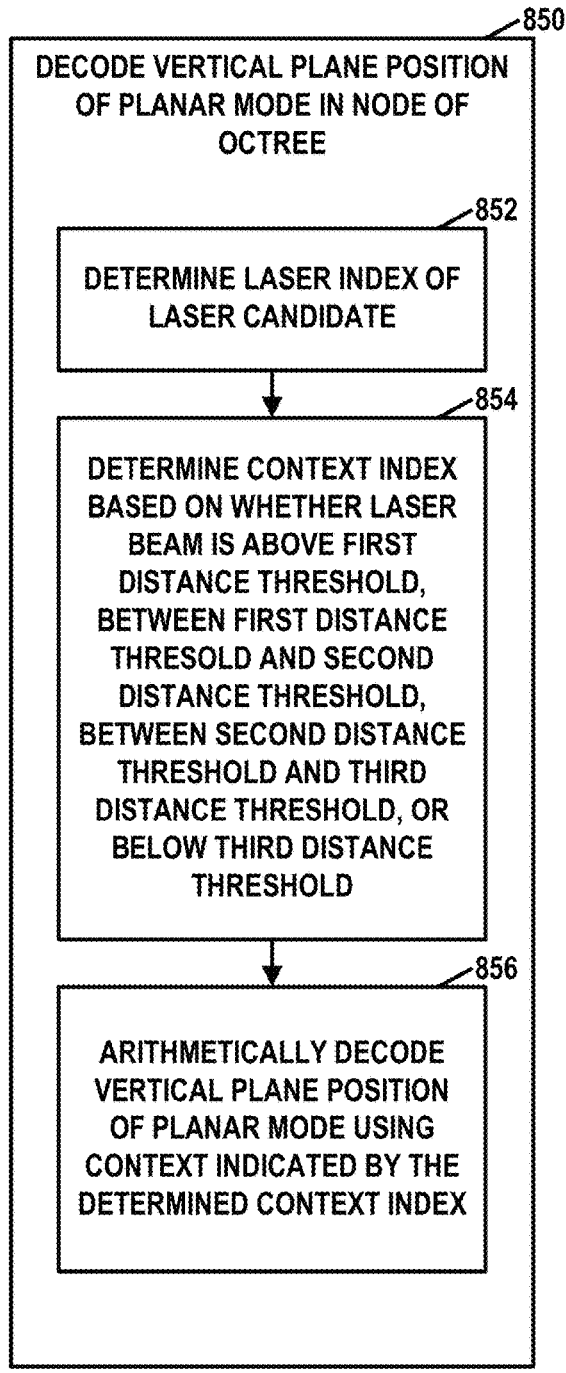
FIG. 8A                    FIG. 8B

ANGULAR MODE SIMPLIFICATION FOR GEOMETRY-BASED POINT CLOUD COMPRESSION

This application claims the benefit of U.S. Provisional Patent Application 63/007,282, filed Apr. 8, 2020, and U.S. Provisional Patent Application 63/009,940, filed Apr. 14, 2020, the entire content of each of which is incorporated by reference.

TECHNICAL FIELD

This disclosure relates to point cloud encoding and decoding.

BACKGROUND

A point cloud is a collection of points in a 3-dimensional space. The points may correspond to points on objects within the 3-dimensional space. Thus, a point cloud may be used to represent the physical content of the 3-dimensional space. Point clouds may have utility in a wide variety of situations. For example, point clouds may be used in the context of autonomous vehicles for representing the positions of objects on a roadway. In another example, point clouds may be used in the context of representing the physical content of an environment for purposes of positioning virtual objects in an augmented reality (AR) or mixed reality (MR) application. Point cloud compression is a process for encoding and decoding point clouds. Encoding point clouds may reduce the amount of data required for storage and transmission of point clouds.

SUMMARY

Aspects of this disclosure describes techniques for encoding and/or decoding angular modes bitstreams, such as in bitstreams carrying point cloud data employing Geometry-based Point Cloud Compression (G-PCC). As described herein, syntax elements related to the angular mode, such as syntax elements indicating a vertical plane position and syntax elements indicating a vertical point position offset, are coded using arithmetic coding. Conventional processes for determining contexts for use in arithmetic coding of such syntax elements are complex. This disclosure describes techniques that may reduce the complexity of determining contexts for use in arithmetic coding of such syntax elements.

In one example, this disclosure describes a method of decoding point cloud data, the method comprising: obtaining a geometry bitstream that includes an arithmetically encoded syntax element indicating a vertical plane position of a planar mode of a node of a tree that represents 3-dimensional positions of points in a point cloud represented by the point cloud data; and decoding the vertical plane position of the planar mode in the node, wherein decoding the vertical plane position of the planar mode comprises: determining a laser index of a laser candidate in a set of laser candidates, wherein the determined laser index indicates a laser beam that intersects the node; determining a context index based on whether the laser beam is above a first distance threshold, between the first distance threshold and a second distance threshold, between the second distance threshold and a third distance threshold, or below the third distance threshold; and arithmetically decoding the vertical plane position of the planar mode using a context indicated by the determined context index.

In another example, this disclosure describes a method of encoding point cloud data, the method comprising: encoding a vertical plane position of a planar mode in a node of a tree that represents 3-dimensional positions of points in a point cloud represented by the point cloud data, wherein encoding the vertical plane position of the planar mode comprises: determining a laser index of a laser candidate in a set of laser candidates, wherein the determined laser index indicates a laser beam that intersects the node; determining a context index based on whether the laser beam is above a first distance threshold, between the first distance threshold and a second distance threshold, between the second distance threshold and a third distance threshold, or below the third distance threshold; and arithmetically encoding the vertical plane position of the planar mode using a context indicated by the determined context index.

In another example, this disclosure describes a device for decoding point cloud data, the device comprising: a memory to store the point cloud data; and one or more processors coupled to the memory and implemented in circuitry, the one or more processors configured to: obtain a geometry bitstream that includes an arithmetically encoded syntax element indicating a vertical plane position of a planar mode of a node of a tree that represents 3-dimensional positions of points in a point cloud represented by the point cloud data; and decode the vertical plane position of the planar mode in the node, wherein the one or more processors are configured such that, as part of decoding the vertical plane position of the planar mode, the one or more processors: determine a laser index of a laser candidate in a set of laser candidates, wherein the determined laser index indicates a laser beam that intersects the node; determine a context index based on whether the laser beam is above a first distance threshold, between the first distance threshold and a second distance threshold, between the second distance threshold and a third distance threshold, or below the third distance threshold; and arithmetically decode the vertical plane position of the planar mode using a context indicated by the determined context index.

In another example, this disclosure describes a device for encoding point cloud data, the device comprising: a memory to store the point cloud data; and one or more processors coupled to the memory and implemented in circuitry, the one or more processors configured to encode a point cloud represented by the point cloud data, wherein the one or more processors are configured to, as part of encoding the point cloud: encode a vertical plane position of a planar mode in a node of a tree that represents 3-dimensional positions of points in the point cloud, wherein the one or more processors are configured such that, as part of encoding the vertical plane position of the planar mode, the one or more processors: determine a laser index of a laser candidate in a set of laser candidates, wherein the determined laser index indicates a laser beam that intersects the node; determine a context index based on whether the laser beam is above a first distance threshold, between the first distance threshold and a second distance threshold, between the second distance threshold and a third distance threshold, or below the third distance threshold; and arithmetically encode the vertical plane position of the planar mode using a context indicated by the determined context index.

In another example, this disclosure describes a device for decoding point cloud data, the device comprising: means for obtaining a geometry bitstream that includes an arithmetically encoded syntax element indicating a vertical plane position of a planar mode of a node of a tree that represents 3-dimensional positions of points in a point cloud represented by the point cloud data; and means for decoding the vertical plane position of the planar mode in the node, wherein the means for decoding the vertical plane position of the planar mode comprises: means for determining a laser index of a laser candidate in a set of laser candidates, wherein the determined laser index indicates a laser beam that intersects the node; means for determining a context index based on whether the laser beam is above a first distance threshold, between the first distance threshold and a second distance threshold, between the second distance threshold and a third distance threshold, or below the third distance threshold; and means for arithmetically decoding the vertical plane position of the planar mode using a context indicated by the determined context index.

In another example, this disclosure describes a device for encoding point cloud data, the device comprising: means for encoding the point cloud data, wherein the means for encoding the point cloud data comprises means for encoding a vertical plane position of a planar mode in a node of a tree that represents 3-dimensional positions of points in a point cloud represented by the point cloud data, wherein the means for encoding the vertical plane position of the planar mode comprises: means for determining a laser index of a laser candidate in a set of laser candidates, wherein the determined laser index indicates a laser beam that intersects the node; means for determining a context index based on whether the laser beam is above a first distance threshold, between the first distance threshold and a second distance threshold, between the second distance threshold and a third distance threshold, or below the third distance threshold; and means for arithmetically encoding the vertical plane position of the planar mode using a context indicated by the determined context index.

In another example, this disclosure describes a computer-readable storage medium having stored thereon instructions that, when executed, cause one or more processors to: obtain a geometry bitstream that includes an arithmetically encoded syntax element indicating a vertical plane position of a planar mode of a node of a tree that represents 3-dimensional positions of points in a point cloud; and decode the vertical plane position of the planar mode in the node, wherein the instructions that cause the one or more processors to decode the vertical plane position of the planar mode comprise instructions that, when executed, cause the one or more processors to: determine a laser index of a laser candidate in a set of laser candidates, wherein the determined laser index indicates a laser beam that intersects the node; determine a context index based on whether the laser beam is above a first distance threshold, between the first distance threshold and a second distance threshold, between the second distance threshold and a third distance threshold, or below the third distance threshold; and arithmetically decode the vertical plane position of the planar mode using a context indicated by the determined context index.

In another example, this disclosure describes a computer-readable storage medium having stored thereon instructions that, when executed, cause one or more processors to: encode a point cloud, wherein the instructions that cause the one or more processors to encode the point cloud comprises instructions that, when executed, cause the one or more processors to encode a vertical plane position of a planar mode in a node of a tree that represents 3-dimensional positions of points in the point cloud, wherein the instructions that cause the one or more processors to encode the vertical plane position of the planar mode comprise instructions that, when executed, cause the one or more processors to: determine a laser index of a laser candidate in a set of laser candidates, wherein the determined laser index indicates a laser beam that intersects the node; determine a context index based on whether the laser beam is above a first distance threshold, between the first distance threshold and a second distance threshold, between the second distance threshold and a third distance threshold, or below the third distance threshold; and arithmetically encode the vertical plane position of the planar mode using a context indicated by the determined context index.

In another example, this disclosure describes a method of decoding point cloud data, the method comprising: obtaining a geometry bitstream that includes an arithmetically encoded syntax element indicating a vertical point position offset within a node of a tree that represents 3-dimensional positions of points in a point cloud represented by the point cloud data; and decoding the vertical point position offset, wherein decoding the vertical point position offset comprises: determining a laser index of a laser candidate in a set of laser candidates, wherein the determined laser index indicates a laser beam that intersects the node; determining a context index based on whether the laser beam is above a first distance threshold, between the first distance threshold and a second distance threshold, between the second distance threshold and a third distance threshold, or below the third distance threshold; and arithmetically decoding a bin of the vertical point position offset using a context indicated by the determined context index.

In another example, this disclosure describes a method of encoding point cloud data, the method comprising: encoding a vertical point position offset within a node of a tree that represents 3-dimensional positions of points in a point cloud represented by the point cloud data, wherein encoding the vertical point position offset comprises: determining a laser index of a laser candidate in a set of laser candidates, wherein the determined laser index indicates a laser beam that intersects the node; determining a context index based on whether the laser beam is above a first distance threshold, between the first distance threshold and a second distance threshold, between the second distance threshold and a third distance threshold, or below the third distance threshold; and arithmetically encoding a bin of the vertical point position offset using a context indicated by the determined context index.

In another example, this disclosure describes a device for decoding point cloud data, the device comprising: a memory to store the point cloud data; and one or more processors coupled to the memory and implemented in circuitry, the one or more processors configured to: obtain a geometry bitstream that includes an arithmetically encoded syntax element indicating a vertical point position offset within a node of a tree that represents 3-dimensional positions of points in a point cloud represented by the point cloud data; and decode the vertical point position offset, wherein the one or more processors are configured such that, as part of decoding the vertical point position offset, the one or more processors: determine a laser index of a laser candidate in a set of laser candidates, wherein the determined laser index indicates a laser beam that intersects the node; determine a context index based on whether the laser beam is above a first distance threshold, between the first distance threshold and a second distance threshold, between the second distance threshold and a third distance threshold, or below the third distance threshold; and arithmetically decode a bin of the vertical point position offset using a context indicated by the determined context index.

In another example, this disclosure describes a device for encoding point cloud data, the device comprising: a memory to store the point cloud data; and one or more processors coupled to the memory and implemented in circuitry, the one or more processors configured to: encode a vertical point position offset within a node of a tree that represents 3-dimensional positions of points in a point cloud represented by the point cloud data, wherein the one or more processors are configured to, as part of encoding the vertical point position offset: determine a laser index of a laser candidate in a set of laser candidates, wherein the determined laser index indicates a laser beam that intersects the node; determine a context index based on whether the laser beam is above a first distance threshold, between the first distance threshold and a second distance threshold, between the second distance threshold and a third distance threshold, or below the third distance threshold; and arithmetically encode a bin of the vertical point position offset using a context indicated by the determined context index.

In another example, this disclosure describes a device for decoding point cloud data, the device comprising: means for obtaining a geometry bitstream that includes an arithmetically encoded syntax element indicating a vertical point position offset within a node of a tree that represents 3-dimensional positions of points in a point cloud represented by the point cloud data; and means for decoding the vertical point position offset, wherein the means for decoding the vertical point position offset comprises: means for determining a laser index of a laser candidate in a set of laser candidates, wherein the determined laser index indicates a laser beam that intersects the node; means for determining a context index based on whether the laser beam is above a first distance threshold, between the first distance threshold and a second distance threshold, between the second distance threshold and a third distance threshold, or below the third distance threshold; and means for arithmetically decoding a bin of the vertical point position offset using a context indicated by the determined context index.

In another example, this disclosure describes a device for encoding point cloud data, the device comprising: means for encoding a vertical point position offset within a node of a tree that represents 3-dimensional positions of points in a point cloud represented by the point cloud data, wherein the means for encoding the vertical point position offset comprises: means for determining a laser index of a laser candidate in a set of laser candidates, wherein the determined laser index indicates a laser beam that intersects the node; means for determining a context index based on whether the laser beam is above a first distance threshold, between the first distance threshold and a second distance threshold, between the second distance threshold and a third distance threshold, or below the third distance threshold; and means for arithmetically encoding a bin of the vertical point position offset using a context indicated by the determined context index.

In another example, this disclosure describes a computer-readable storage medium having stored thereon instructions that, when executed, cause one or more processors to: obtain a geometry bitstream that includes an arithmetically encoded syntax element indicating a vertical point position offset within a node of a tree that represents 3-dimensional positions of points in a point cloud; and decode the vertical point position offset, wherein the instructions that cause the one or more processors to decode the vertical point position offset comprise instructions that, when executed, cause the one or more processors to: determine a laser index of a laser candidate in a set of laser candidates, wherein the determined laser index indicates a laser beam that intersects the node; determine a context index based on whether the laser beam is above a first distance threshold, between the first distance threshold and a second distance threshold, between the second distance threshold and a third distance threshold, or below the third distance threshold; and arithmetically decode a bin of the vertical point position offset using a context indicated by the determined context index.

In another example, this disclosure describes a computer-readable storage medium having stored thereon instructions that, when executed, cause one or more processors to: encode a vertical point position offset within a node of a tree that represents 3-dimensional positions of points in a point cloud, wherein the instructions that cause the one or more processors to encode the vertical point position offset comprise instructions that, when executed, cause the one or more processors to: determine a laser index of a laser candidate in a set of laser candidates, wherein the determined laser index indicates a laser beam that intersects the node; determine a context index based on whether the laser beam is above a first distance threshold, between the first distance threshold and a second distance threshold, between the second distance threshold and a third distance threshold, or below the third distance threshold; and arithmetically encode a bin of the vertical point position offset using a context indicated by the determined context index.

The details of one or more examples are set forth in the accompanying drawings and the description below. Other features, objects, and advantages will be apparent from the description, drawings, and claims.

BRIEF DESCRIPTION OF DRAWINGS

FIG. 8A is a flowchart illustrating an example operation for encoding a vertical plane position in accordance with one or more techniques of this disclosure.

FIG. 8B is a flowchart illustrating an example operation for decoding a vertical plane position in accordance with one or more techniques of this disclosure.

DETAILED DESCRIPTION

Figure 1:
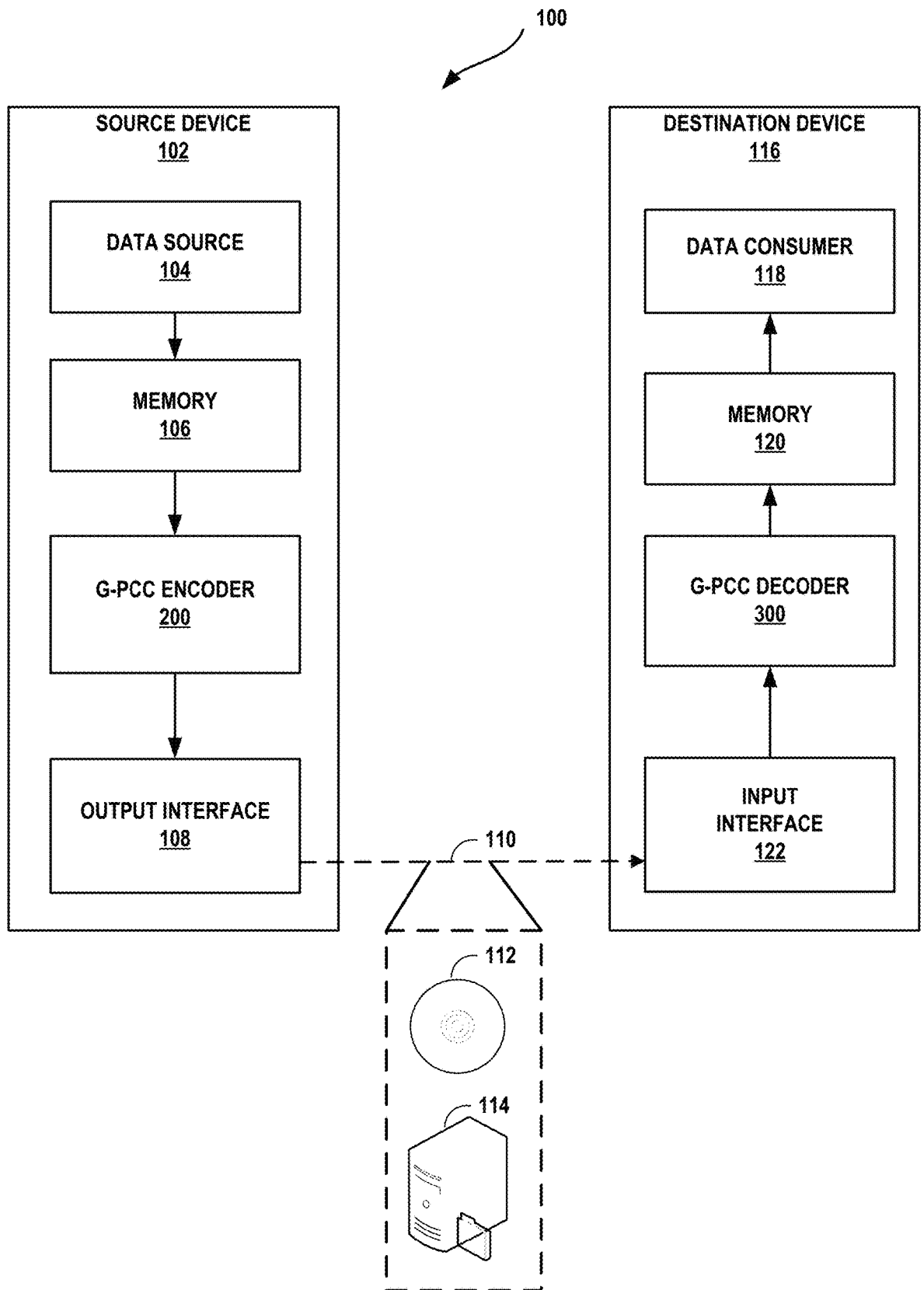
FIG. 1 is a block diagram illustrating an example encoding and decoding system that may perform the techniques of this disclosure.

A point cloud is a collection of points in a 3-dimensional (3D) space. Point cloud data may include all or some data representing a point cloud. Geometry-based point cloud compression (G-PCC) is an approach for reducing the amount of data needed to encode or store point clouds. As part of encoding a point cloud, a G-PCC encoder generates an octree. Each node of the octree corresponds to a cuboid space. For ease of explanation, this disclosure may, in some circumstances, refer to a node and the cuboid space corresponding to the node interchangeably. Nodes of the octree can have zero child nodes or eight child nodes. In other examples, nodes can be divided into child nodes according to other tree structures. The child nodes of a parent correspond to equally sized cuboids within the cuboid corresponding to the parent node. The positions of individual points of a point cloud can be signaled relative to nodes corresponding to cuboids containing the points. If a cuboid corresponding to a node does not contain any points of the point cloud, the node is said to be unoccupied. If the node is unoccupied, it may not be necessary to signal additional data with respect to the node. Conversely, if a cuboid corresponding to a node contains one or more points of the point cloud, the node is said to be occupied.

Planar mode is a technique that may improve encoding or signaling of which nodes in the octree are occupied. Planar mode may be used when all occupied child nodes of the node are adjacent to a plane and on a side of the plane associated with increasing coordinate values for a dimension orthogonal to the plane. For instance, planar mode may be used for a node when all occupied child nodes of the node are above or below a horizontal plane passing through a center point of the node, or planar mode may be used for a node when all occupied child nodes of the node are on a close side or a farther side of a vertical plane passing through the center point of the node. A G-PCC encoder may signal a plane position syntax element for each of an x, y, and z dimension. The plane position syntax element for a dimension (e.g., an x, y, or z dimension) indicates whether the plane orthogonal to the dimension is at a first position or a second position. If the plane is at the first position, the plane corresponds to a boundary of the node. If the plane is at the second position, the plane passes through a 3D center of the node. Thus, for the z-dimension, a G-PCC encoder or G-PCC decoder may code a vertical plane position of a planar mode in a node of an octree that represents 3-dimensional positions of points in the point cloud.

The G-PCC coder (e.g., a G-PCC encoder or G-PCC decoder) may use arithmetic coding to code plane position syntax elements. When the G-PCC coder uses arithmetic coding to code a plane position syntax element, the G-PCC coder determines a context index that indicates a context to use for arithmetic coding of the plane position syntax element. A context specifies probabilities for symbols used in arithmetic coding. As described in greater detail elsewhere in this disclosure, conventional techniques for determining the context index are complex. Such complexity may slow the process of coding the point cloud. Moreover, such complexity may increase the cost of hardware that may be used to implement encoders and decoders.

This disclosure describes techniques that may reduce the complexity of determining the context index. For instance, a G-PCC coder may code a vertical plane position of a planar mode in a node of an octree that represents 3-dimensional positions of points in the point cloud. As part of coding the vertical plane position of the planar mode, the G-PCC coder may determine a laser index of a laser candidate in a set of laser candidates. The determined laser index indicates a laser beam that intersects the node. Additionally, the G-PCC coder may determine a context index based on an intersection of the laser beam and the node. For instance, the G-PCC coder may determine a context index based on whether the laser beam is above a first distance threshold, between the first distance threshold and a second distance threshold, between the second distance threshold and a third distance threshold, or below the third distance threshold. The G-PCC coder may arithmetically code the vertical plane position of the planar mode using a context indicated by the determined context index. Determining the context index based on the intersection of the beam and the node in this way may reduce complexity of determining the context index. Although this disclosure describes lasers, laser beams, laser candidates, and other terms involving lasers, these terms are not necessarily limited to instances in which physical lasers are used. Rather, these terms may be used with respect to physical lasers or other range-finding technologies. Moreover, these terms may be used with respect to conceptual beams used for purposes of coding point clouds. In other words, the terms "laser," "laser beam," etc., may not refer to real lasers and laser beams, but rather the concept of a laser and laser beam may be used for purposes of coding point clouds.

As noted above, the positions of individual points of a point cloud can be encoded relative to nodes containing the points. In some examples, the positions of points in a node may be encoded using an inferred direct coding mode (IDCM). When a point is signaled using IDCM, a G-PCC encoder encodes a point offset that indicates an offset, in a specific dimension (e.g., a vertical dimension, horizontal dimension, lateral dimension, etc.), of the point relative to an origin point of the node. A point offset may be referred to as a point position offset. G-PCC coders may determine a context and use the context in arithmetic coding of the point offset. Conventional techniques for determining the context to use in arithmetic coding of a point offset have been complex.

This disclosure describes techniques that may reduce the complexity of processes for determining a context to use for arithmetic coding of point offsets. For instance, as described in this disclosure, a G-PCC coder may code a vertical point position offset within a node of a tree (e.g., an octree) that represents 3-dimensional positions of points in the point cloud. As part of coding the vertical point position offset, the G-PCC coder may determine a laser index of a laser candidate in a set of laser candidates. The determined laser index indicates a laser beam that intersects the node. Additionally, the G-PCC coder may determine a context index based on whether the laser beam is above a first distance threshold, between the first distance threshold and a second distance threshold, between the second distance threshold and a third distance threshold, or below the third distance threshold. The G-PCC coder may arithmetically code bins of the vertical point position offset using a context indicated by the determined context index.

FIG. 1 is a block diagram illustrating an example encoding and decoding system 100 that may perform the techniques of this disclosure. The techniques of this disclosure are generally directed to coding (encoding and/or decoding) point cloud data, i.e., to support point cloud compression. In general, point cloud data includes any data for processing a point cloud. The coding may be effective in compressing and/or decompressing point cloud data.

As shown in FIG. 1, system 100 includes a source device 102 and a destination device 116. Source device 102 provides encoded point cloud data to be decoded by a destination device 116. Particularly, in the example of FIG. 1, source device 102 provides the point cloud data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming devices, terrestrial or marine vehicles, spacecraft, aircraft, robots, LIDAR devices, satellites, surveillance or security equipment, or the like. In some cases, source device 102 and destination device 116 may be equipped for wireless communication.

In the example of FIG. 1, source device 102 includes a data source 104, a memory 106, a G-PCC encoder 200, and an output interface 108. Destination device 116 includes an input interface 122, a G-PCC decoder 300, a memory 120, and a data consumer 118. G-PCC encoder 200 of source device 102 and G-PCC decoder 300 of destination device 116 may be configured to apply the techniques of this disclosure related to simplifications for G-PCC angular modes. Thus, source device 102 represents an example of an encoding device, while destination device 116 represents an example of a decoding device. In other examples, source device 102 and destination device 116 may include other components or arrangements. For example, source device 102 may receive data (e.g., point cloud data) from an internal or external source. Likewise, destination device 116 may interface with an external data consumer, rather than include a data consumer in the same device.

System 100 as shown in FIG. 1 is merely one example. In general, other digital encoding and/or decoding devices may perform the techniques of this disclosure related to simplifications for G-PCC angular modes. Source device 102 and destination device 116 are merely examples of such devices in which source device 102 generates coded data for transmission to destination device 116. This disclosure refers to a "coding" device as a device that performs coding (encoding and/or decoding) of data. Thus, G-PCC encoder 200 and G-PCC decoder 300 represent examples of coding devices, in particular, an encoder and a decoder, respectively. Similarly, the term "coding" may refer to either of encoding or decoding. In some examples, source device 102 and destination device 116 may operate in a substantially symmetrical manner such that each of source device 102 and destination device 116 includes encoding and decoding components. Hence, system 100 may support one-way or two-way transmission between source device 102 and destination device 116, e.g., for streaming, playback, broadcasting, telephony, navigation, and other applications.

In general, data source 104 represents a source of data (i.e., raw, unencoded point cloud data) and may provide a sequential series of "frames") of the data to G-PCC encoder 200, which encodes data for the frames. Data source 104 of source device 102 may include a point cloud capture device, such as any of a variety of sensors, e.g., a 3D scanner, a light detection and ranging (LIDAR) device, one or more image or video cameras, an archive containing previously captured data, and/or a data feed interface to receive data from a data content provider. In this way, data source 104 may generate a point cloud. Alternatively or additionally, point cloud data may be computer-generated from scanner, camera, sensor or other data. For example, data source 104 may generate computer graphics-based data as the source data, or produce a combination of live data, archived data, and computer-generated data. In each case, G-PCC encoder 200 encodes the captured, pre-captured, or computer-generated data. G-PCC encoder 200 may rearrange the frames from the received order (sometimes referred to as "display order") into a coding order for coding. G-PCC encoder 200 may generate one or more bitstreams including encoded data. Source device 102 may then output the encoded data via output interface 108 onto computer-readable medium 110 for reception and/or retrieval by, e.g., input interface 122 of destination device 116.

Memory 106 of source device 102 and memory 120 of destination device 116 may represent general purpose memories. In some examples, memory 106 and memory 120 may store raw data, e.g., raw data from data source 104 and raw, decoded data from G-PCC decoder 300. Additionally or alternatively, memory 106 and memory 120 may store software instructions executable by, e.g., G-PCC encoder 200 and G-PCC decoder 300, respectively. Although memory 106 and memory 120 are shown separately from G-PCC encoder 200 and G-PCC decoder 300 in this example, it should be understood that G-PCC encoder 200 and G-PCC decoder 300 may also include internal memories for functionally similar or equivalent purposes. Furthermore, memory 106 and memory 120 may store encoded data, e.g., output from G-PCC encoder 200 and input to G-PCC decoder 300. In some examples, portions of memory 106 and memory 120 may be allocated as one or more buffers, e.g., to store raw, decoded, and/or encoded data. For instance, memory 106 and memory 120 may store data representing a point cloud.

Computer-readable medium 110 may represent any type of medium or device capable of transporting the encoded data from source device 102 to destination device 116. In one example, computer-readable medium 110 represents a communication medium to enable source device 102 to transmit encoded data (e.g., an encoded point cloud) directly to destination device 116 in real-time, e.g., via a radio frequency network or computer-based network. Output interface 108 may modulate a transmission signal including the encoded data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packetbased network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded data.

In some examples, source device 102 may output encoded data to file server 114 or another intermediate storage device that may store the encoded data generated by source device 102. Destination device 116 may access stored data from file server 114 via streaming or download. File server 114 may be any type of server device capable of storing encoded data and transmitting that encoded data to the destination device 116. File server 114 may represent a web server (e.g., for a web site), a File Transfer Protocol (FTP) server, a content delivery network device, or a network attached storage (NAS) device. Destination device 116 may access encoded data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to G-PCC encoder 200 and/or output interface 108, and destination device 116 may include an SoC device to perform the functionality attributed to G-PCC decoder 300 and/or input interface 122.

The techniques of this disclosure may be applied to encoding and decoding in support of any of a variety of applications, such as communication between autonomous vehicles, communication between scanners, cameras, sensors and processing devices such as local or remote servers, geographic mapping, or other applications.

In some examples, source device 102 and/or destination device 116 are mobile devices, such as mobile phones, augmented reality (AR) devices, or mixed reality (MR) devices. In such examples, source device 102 may generate and encode a point cloud as part of a process to map the local environment of source device 102. With respect to AR and MR examples, destination device 116 may use the point cloud to generate a virtual environmental based on the local environment of source device 102. In some examples, source device 102 and/or destination device 116 are terrestrial or marine vehicles, spacecraft, or aircraft. In such examples, source device 102 may generate and encode a point cloud as part of a process to map an environment of source device, e.g., for purposes of autonomous navigation, crash forensics, and other purposes.

Input interface 122 of destination device 116 receives an encoded bitstream from computer-readable medium 110 (e.g., a communication medium, storage device 112, file server 114, or the like). The encoded bitstream may include signaling information defined by G-PCC encoder 200, which is also used by G-PCC decoder 300, such as syntax elements having values that describe characteristics and/or processing of coded units (e.g., slices, pictures, groups of pictures, sequences, or the like). Data consumer 118 uses the decoded data. For example, data consumer 118 may use the decoded data to determine the locations of physical objects. In some examples, data consumer 118 may comprise a display to present imagery based on a point cloud. For example, data consumer 118 may use points of the point cloud as vertices of polygons and may use color attributes of points of the point cloud to shade the polygons. In this example, data consumer 118 may then rasterize the polygons to present computer-generated images based on the shaded polygons.

G-PCC encoder 200 and G-PCC decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of G-PCC encoder 200 and G-PCC decoder 300 may be included in one or more encoders or decoders, either of which may be integrated as part of a combined encoder/decoder (CODEC) in a respective device. A device including G-PCC encoder 200 and/or G-PCC decoder 300 may comprise one or more integrated circuits, microprocessors, and/or other types of devices.

G-PCC encoder 200 and G-PCC decoder 300 may operate according to a coding standard, such as video point cloud compression (V-PCC) standard or a geometry point cloud compression (G-PCC) standard. This disclosure may generally refer to coding (e.g., encoding and decoding) of pictures to include the process of encoding or decoding data. An encoded bitstream generally includes a series of values for syntax elements representative of coding decisions (e.g., coding modes).

This disclosure may generally refer to "signaling" certain information, such as syntax elements. The term "signaling" may generally refer to the communication of values for syntax elements and/or other data used to decode encoded data. That is, G-PCC encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Point cloud compression activities are categorized in two different approaches. The first approach is "Video point cloud compression" (V-PCC), which segments the 3D object, and projects the segments in multiple 2D planes (which are represented as "patches" in the 2D frame), which are further coded by a video codec such as a High Efficiency Video Coding (HEVC) (ITU-T H.265) codec. The second approach is "Geometry-based point cloud compression" (G-PCC), which directly compresses 3D geometry, i.e., position of a set of points in 3D space, and associated attribute values (for each point associated with the 3D geometry). G-PCC addresses the compression of point clouds in both Category 1 (static point clouds) and Category 3 (dynamically acquired point clouds). A recent draft of the G-PCC standard is available in G-PCC DIS, ISO/IEC JTC1/SC29/WG11 w19088, Brussels, Belgium, January 2020 (hereinafter, "w19088"), and a description of the codec is available in G-PCC Codec Description v6, ISO/IEC JTC1/SC29/WG11 w19091, Brussels, Belgium, January 2020 (hereinafter, "w19091").

A point cloud contains a set of points in a 3D space and may have attributes associated with the points. The attributes may be color information such as R, G, B or Y, Cb, Cr, or reflectance information, or other attributes. Point clouds may be captured by a variety of cameras or sensors such as LIDAR sensors and 3D scanners and may also be computer-generated. Point cloud data are used in a variety of applications including, but not limited to, construction (modeling), graphics (3D models for visualizing and animation), the automotive industry (LIDAR sensors used to help in navigation), and in other applications that may employ the use of mobile phones, tablet computers, or other computing devices.

The 3D space occupied by a point cloud data may be enclosed by a virtual bounding box. The position of the points in the bounding box may be represented by a certain precision; therefore, the positions of one or more points may be quantized based on the precision. At the smallest level, the bounding box is split into voxels which are the smallest unit of space represented by a unit cube. A voxel in the bounding box may be associated with zero, one, or more than one point. The bounding box may be split into multiple cube/cuboid regions, which may be called tiles. Each tile may be coded into one or more slices. The partitioning of the bounding box into slices and tiles may be based on number of points in each partition, or based on other considerations (e.g., a particular region may be coded as tiles). The slice regions may be further partitioned using splitting decisions similar to those in video codecs.

Figure 2:
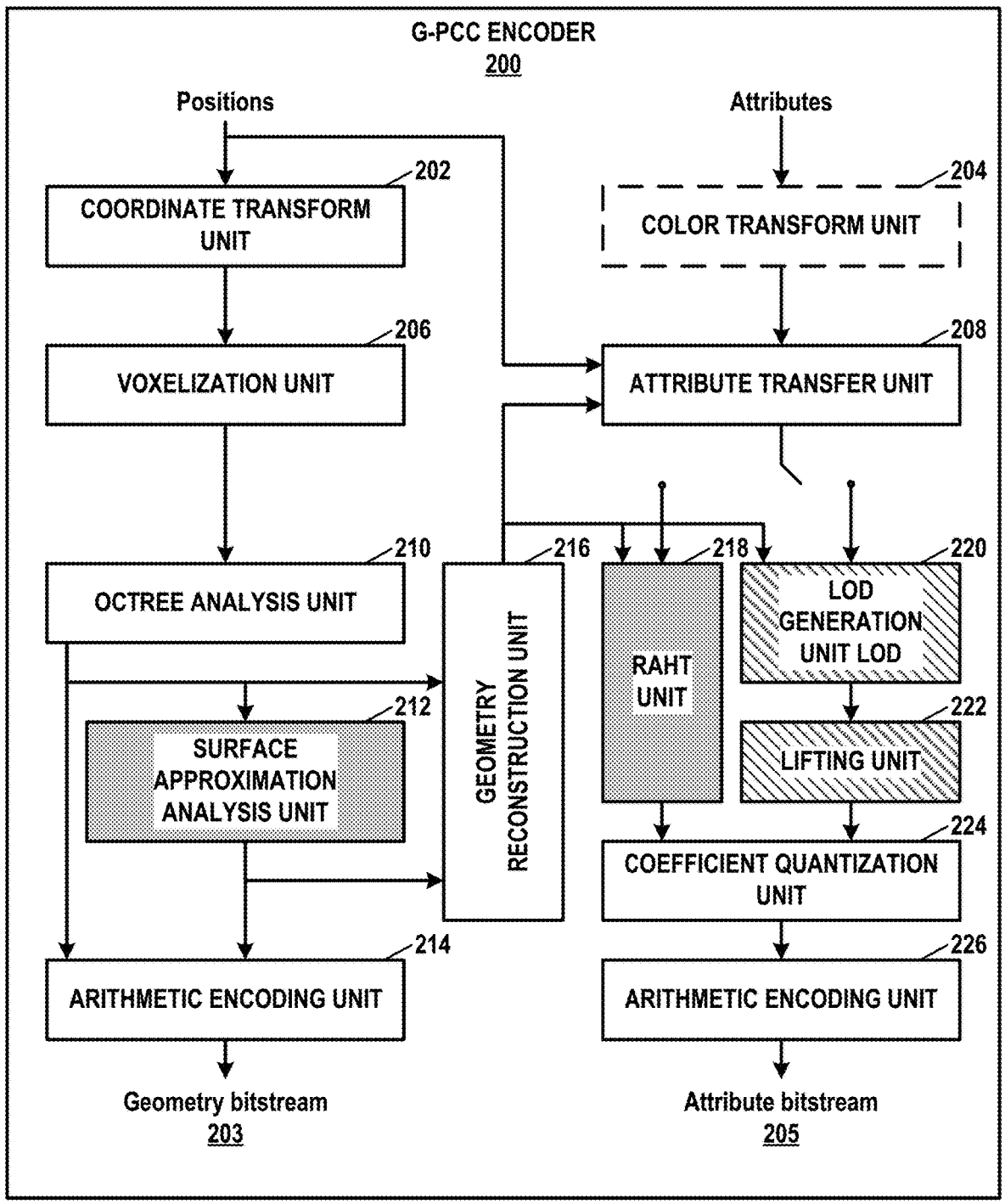
FIG. 2 is a block diagram illustrating an example Geometry Point Cloud Compression (G-PCC) encoder.
Figure 3:
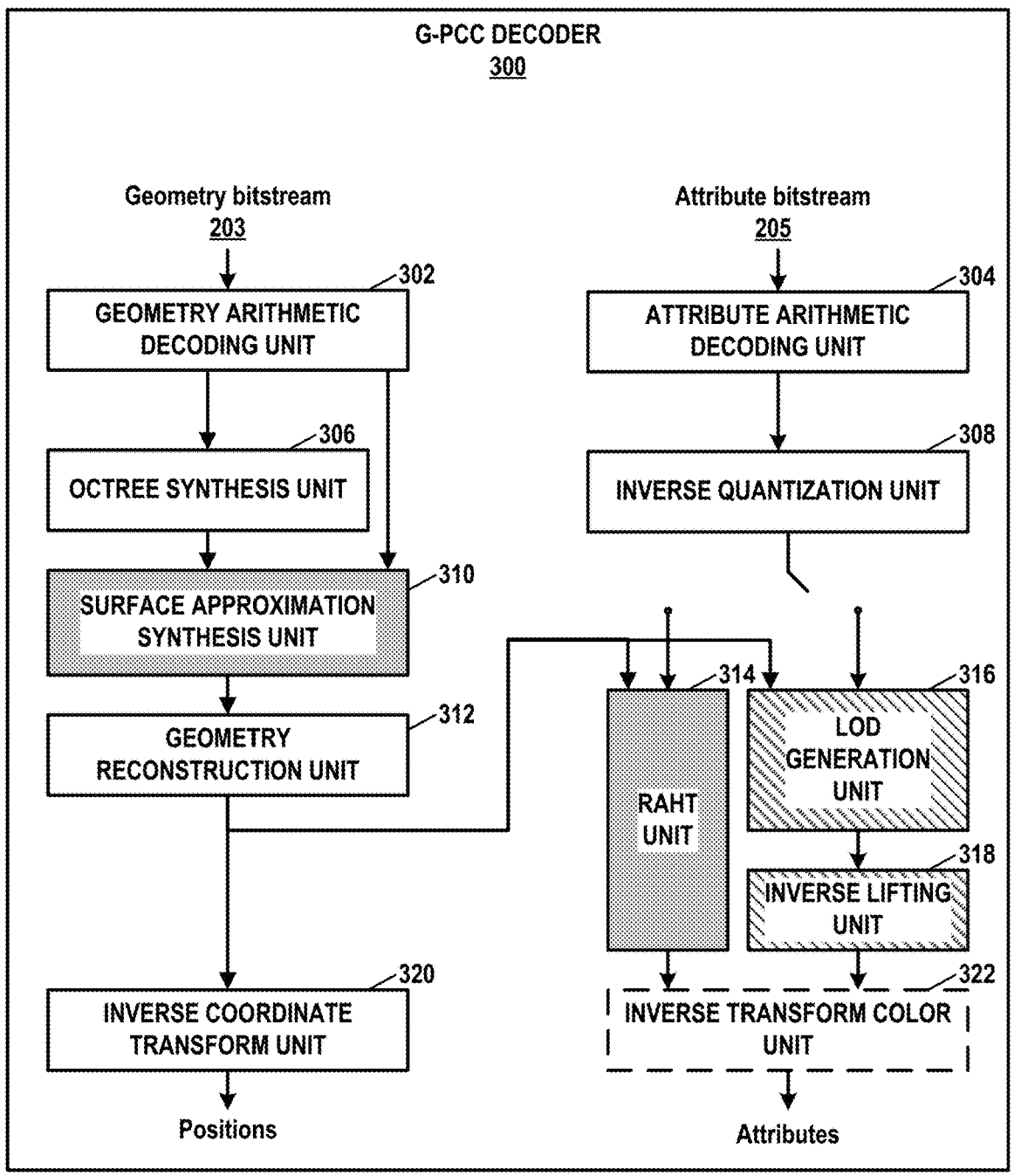
FIG. 3 is a block diagram illustrating an example G-PCC decoder.

FIG. 2 provides an overview of G-PCC encoder 200. FIG. 3 provides an overview of G-PCC decoder 300. The modules shown are logical, and do not necessarily correspond one-to-one to implemented code in the reference implementation of G-PCC codec, i.e., TMC13 test model software studied by ISO/IEC MPEG (JTC 1/SC 29/WG 11).

In both G-PCC encoder 200 and G-PCC decoder 300, point cloud positions are coded first. Attribute coding depends on the decoded geometry. In FIG. 2 and FIG. 3, the gray-shaded modules are options typically used for Category 1 data. Diagonal-crosshatched modules are options typically used for Category 3 data. All the other modules are common between Categories 1 and 3.

For Category 3 data, the compressed geometry is typically represented as an octree from the root all the way down to a leaf level of individual voxels. For Category 1 data, the compressed geometry is typically represented by a pruned octree (i.e., an octree from the root down to a leaf level of blocks larger than voxels) plus a model that approximates the surface within each leaf of the pruned octree. In this way, both Category 1 and 3 data share the octree coding mechanism, while Category 1 data may in addition approximate the voxels within each leaf with a surface model. The surface model used is a triangulation comprising 1-10 triangles per block, resulting in a triangle soup. The Category 1 geometry codec is therefore known as the Trisoup geometry codec, while the Category 3 geometry codec is known as the Octree geometry codec.

At each node of an octree, an occupancy is signaled (when not inferred) for one or more of its child nodes (up to eight nodes). Multiple neighborhoods are specified including (a) nodes that share a face with a current octree node, (b) nodes that share a face, edge or a vertex with the current octree node, etc. Within each neighborhood, the occupancy of a node and/or its children may be used to predict the occupancy of the current node or its children. For points that are sparsely populated in certain nodes of the octree, the codec (e.g., as implemented by G-PCC encoder 200 and G-PCC decoder 300) also supports a direct coding mode where the 3D position of the point is encoded directly. A flag may be signaled to indicate that a direct mode is signaled. At the lowest level, the number of points associated with the octree node/leaf node may also be coded.

Once the geometry is coded, the attributes corresponding to the geometry points are coded. When there are multiple attribute points corresponding to one reconstructed/decoded geometry point, an attribute value may be derived that is representative of the reconstructed point.

There are three attribute coding methods in G-PCC: Region Adaptive Hierarchical Transform (RAHT) coding, interpolation-based hierarchical nearest-neighbour prediction (Predicting Transform), and interpolation-based hierarchical nearest-neighbor prediction with an update/lifting step (Lifting Transform). RAHT and Lifting are typically used for Category 1 data, while Predicting is typically used for Category 3 data. However, either method may be used for any data, and, similar with the geometry codecs in G-PCC, the attribute coding method used to code the point cloud is specified in the bitstream.

The coding of the attributes may be conducted in a level-of-detail (LoD), where for with each level of detail, a finer representation of the point cloud attribute may be obtained. Each level of detail may be specified based on a distance metric from the neighboring nodes or based on a sampling distance.

At G-PCC encoder 200, the residuals obtained as the output of the coding methods for the attributes are quantized. The quantized residuals may be coded using context adaptive arithmetic coding. To apply CABAC encoding to a syntax element, G-PCC encoder 200 may binarize the value of the syntax element to form a series of one or more bits, which are referred to as "bins." In addition, G-PCC encoder 200 may identify a coding context. The coding context may identify probabilities of bins having particular values. For instance, a coding context may indicate a 0.7 probability of coding a 0-valued bin and a 0.3 probability of coding a 1-valued bin. After identifying the coding context, G-PCC encoder 200 may divide an interval into a lower sub-interval and an upper sub-interval. One of the sub-intervals may be associated with the value 0 and the other sub-interval may be associated with the value 1. The widths of the sub-intervals may be proportional to the probabilities indicated for the associated values by the identified coding context. If a bin of the syntax element has the value associated with the lower sub-interval, the encoded value may be equal to the lower boundary of the lower sub-interval. If the same bin of the syntax element has the value associated with the upper sub-interval, the encoded value may be equal to the lower boundary of the upper sub-interval. To encode the next bin of the syntax element, G-PCC encoder 200 may repeat these steps with the interval being the sub-interval associated with the value of the encoded bit. When G-PCC encoder 200 repeats these steps for the next bin, G-PCC encoder 200 may use modified probabilities based on the probabilities indicated by the identified coding context and the actual values of bins encoded.

When G-PCC decoder 300 performs CABAC decoding on a value of a syntax element, G-PCC decoder 300 may identify a coding context. G-PCC decoder 300 may then divide an interval into a lower sub-interval and an upper sub-interval. One of the sub-intervals may be associated with the value 0 and the other sub-interval may be associated with the value 1. The widths of the sub-intervals may be proportional to the probabilities indicated for the associated values by the identified coding context. If the encoded value is within the lower sub-interval, G-PCC decoder 300 may decode a bin having the value associated with the lower sub-interval. If the encoded value is within the upper sub-interval, G-PCC decoder 300 may decode a bin having the value associated with the upper sub-interval. To decode a next bin of the syntax element, G-PCC decoder 300 may repeat these steps with the interval being the sub-interval that contains the encoded value. When G-PCC decoder 300 repeats these steps for the next bin, G-PCC decoder 300 may use modified probabilities based on the probabilities indicated by the identified coding context and the decoded bins. G-PCC decoder 300 may then de-binarize the bins to recover the value of the syntax element.

In the example of FIG. 2, G-PCC encoder 200 may include a coordinate transform unit 202, a color transform unit 204, a voxelization unit 206, an attribute transfer unit 208, an octree analysis unit 210, a surface approximation analysis unit 212, an arithmetic encoding unit 214, a geometry reconstruction unit 216, an RAHT unit 218, a LOD generation unit 220, a lifting unit 222, a coefficient quantization unit 224, and an arithmetic encoding unit 226.

As shown in the example of FIG. 2, G-PCC encoder 200 may receive a set of positions of points in the point cloud and a set of attributes. G-PCC encoder 200 may obtain the set of positions of the points in the point cloud and the set of attributes from data source 104 (FIG. 1). The positions may include coordinates of points in a point cloud. The attributes may include information about the points in the point cloud, such as colors associated with points in the point cloud. G-PCC encoder 200 may generate a geometry bitstream 203 that includes an encoded representation of the positions of the points in the point cloud. G-PCC encoder 200 may also generate an attribute bitstream 205 that includes an encoded representation of the set of attributes.

Coordinate transform unit 202 may apply a transform to the coordinates of the points to transform the coordinates from an initial domain to a transform domain. This disclosure may refer to the transformed coordinates as transform coordinates. Color transform unit 204 may apply a transform in order to transform color information of the attributes to a different domain. For example, color transform unit 204 may transform color information from an RGB color space to a YCbCr color space.

Furthermore, in the example of FIG. 2, voxelization unit 206 may voxelize the transform coordinates. Voxelization of the transform coordinates may include quantization and removing some points of the point cloud. In other words, multiple points of the point cloud may be subsumed within a single "voxel," which may thereafter be treated in some respects as one point. Furthermore, octree analysis unit 210 may generate an octree based on the voxelized transform coordinates. Additionally, in the example of FIG. 2, surface approximation analysis unit 212 may analyze the points to potentially determine a surface representation of sets of the points. Arithmetic encoding unit 214 may entropy encode syntax elements representing the information of the octree and/or surfaces determined by surface approximation analysis unit 212. G-PCC encoder 200 may output these syntax elements in geometry bitstream 203. Geometry bitstream 203 may also include other syntax elements, including syntax elements that are not arithmetically encoded.

Geometry reconstruction unit 216 may reconstruct transform coordinates of points in the point cloud based on the octree, data indicating the surfaces determined by surface approximation analysis unit 212, and/or other information. The number of transform coordinates reconstructed by geometry reconstruction unit 216 may be different from the original number of points of the point cloud because of voxelization and surface approximation. This disclosure may refer to the resulting points as reconstructed points. Attribute transfer unit 208 may transfer attributes of the original points of the point cloud to reconstructed points of the point cloud.

Furthermore, RAHT unit 218 may apply RAHT coding to the attributes of the reconstructed points. Alternatively or additionally, LOD generation unit 220 and lifting unit 222 may apply LOD processing and lifting, respectively, to the attributes of the reconstructed points. RAHT unit 218 and lifting unit 222 may generate coefficients based on the attributes. Coefficient quantization unit 224 may quantize the coefficients generated by RAHT unit 218 or lifting unit 222. Arithmetic encoding unit 226 may apply arithmetic coding to syntax elements representing the quantized coefficients. G-PCC encoder 200 may output these syntax elements in attribute bitstream 205. Attribute bitstream 205 may also include other syntax elements, including non-arithmetically encoded syntax elements.

In the example of FIG. 3, G-PCC decoder 300 may include a geometry arithmetic decoding unit 302, an attribute arithmetic decoding unit 304, an octree synthesis unit 306, an inverse quantization unit 308, a surface approximation synthesis unit 310, a geometry reconstruction unit 312, a RAHT unit 314, a LOD generation unit 316, an inverse lifting unit 318, an inverse transform coordinate unit 320, and an inverse transform color unit 322.

G-PCC decoder 300 may obtain geometry bitstream 203 and attribute bitstream 205. Geometry arithmetic decoding unit 302 of decoder 300 may apply arithmetic decoding (e.g., Context-Adaptive Binary Arithmetic Coding (CABAC) or other type of arithmetic decoding) to syntax elements in the geometry bitstream. Similarly, attribute arithmetic decoding unit 304 may apply arithmetic decoding to syntax elements in the attribute bitstream.

Octree synthesis unit 306 may synthesize an octree based on syntax elements parsed from the geometry bitstream. In instances where surface approximation is used in the geometry bitstream, surface approximation synthesis unit 310 may determine a surface model based on syntax elements parsed from the geometry bitstream and based on the octree.

Furthermore, geometry reconstruction unit 312 may perform a reconstruction to determine coordinates of points in a point cloud. Inverse transform coordinate unit 320 may apply an inverse transform to the reconstructed coordinates to convert the reconstructed coordinates (positions) of the points in the point cloud from a transform domain back into an initial domain.

Additionally, in the example of FIG. 3, inverse quantization unit 308 may inverse quantize attribute values. The attribute values may be based on syntax elements obtained from the attribute bitstream (e.g., including syntax elements decoded by attribute arithmetic decoding unit 304).

Depending on how the attribute values are encoded, RAHT unit 314 may perform RAHT coding to determine, based on the inverse quantized attribute values, color values for points of the point cloud. Alternatively, LOD generation unit 316 and inverse lifting unit 318 may determine color values for points of the point cloud using a level of detail-based technique.

Furthermore, in the example of FIG. 3, inverse transform color unit 322 may apply an inverse color transform to the color values. The inverse color transform may be an inverse of a color transform applied by color transform unit 204 of encoder 200. For example, color transform unit 204 may transform color information from an RGB color space to a YCbCr color space. Accordingly, inverse color transform unit 322 may transform color information from the YCbCr color space to the RGB color space.

The various units of FIG. 2 and FIG. 3 are illustrated to assist with understanding the operations performed by encoder 200 and decoder 300. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

The angular coding mode (i.e., the angular mode) was adopted at the 129th MPEG meeting in Brussels, Belgium. The following descriptions are based on the original MPEG contributions documents: Sébastien Lasserre, Jonathan Taquet, "[GPCC][CE 13.22 related] An improvement of the planar coding mode," ISO/IEC JTC1/SC29/WG11 MPEG/m50642, Geneva, CH, October 2019; and w19088. The angular coding mode is optionally used together with planar mode (e.g., as described in Sebastien Lasserre, David Flynn, "[GPCC] Planar mode in octree-based geometry coding," ISO/IEC JTC1/SC29/WG11 MPEG/m48906, Gothenburg, Sweden, July 2019) and improves the coding of the vertical (z) plane position syntax element by employing knowledge of positions and angles of sensing laser beams in a typical LIDAR sensor (see e.g., Sebastien Lasserre, Jonathan Taquet, "[GPCC] CE 13.22 report on angular mode," ISO/IEC JTC1/SC29/WG11 MPEG/m51594, Brussels, Belgium, January 2020).

Figure 4:
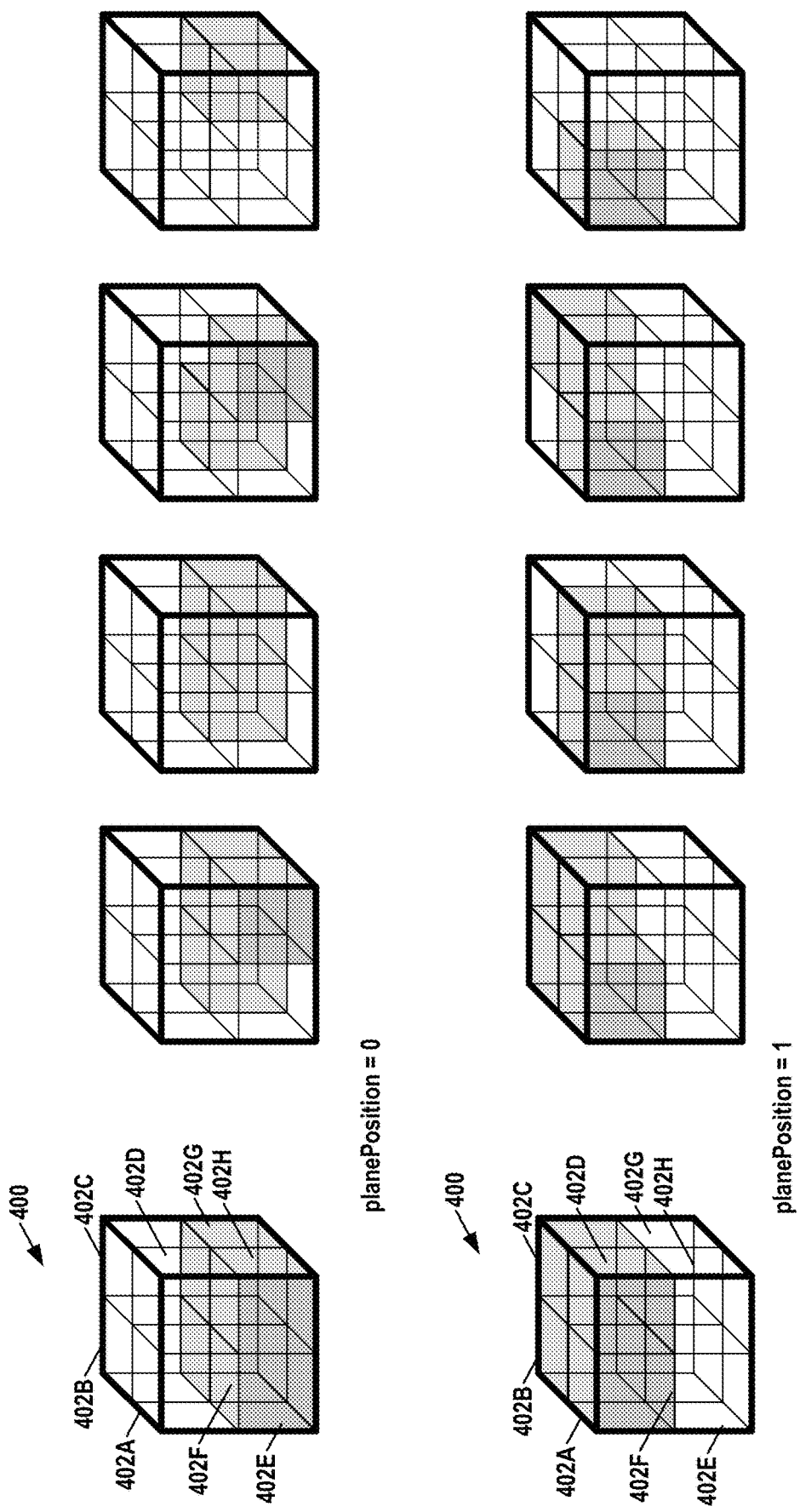
FIG. 4 is a conceptual diagram illustrating example planar occupancy in a vertical direction.

FIG. 4 is a conceptual diagram illustrating example planar occupancy in a vertical direction. In the example of FIG. 4, a node 400 is partitioned into eight child nodes. Child nodes 402 may be occupied or unoccupied. In the example of FIG. 4, occupied child nodes are shaded. When one or more child nodes 402A-402D are occupied and none of child nodes 402E-402H are occupied, G-PCC encoder 200 may signal a plane position (planePosition) syntax element with a value of 0 to indicate that all occupied child nodes are adjacent on a positive side (i.e., a side of increasing z-coordinates) of a plane of the minimum z coordinate of node 400. When one or more child nodes 402E-402H are occupied and none of child nodes 402A-402D are occupied, G-PCC encoder 200 may signal a plane position (planePosition) syntax element with a value of 1 to indicate that all occupied child nodes are adjacent on a positive side of a plane of a midpoint z coordinate of node 400. In this way, the plane position syntax element may indicate a vertical plane position of a planar mode in node 400.

Furthermore, the angular coding mode can optionally be used to improve the coding of vertical z-position bits in Inferred Direct Coding Mode (IDCM) (Sebastien Lasserre, Jonathan Taquet, "[GPCC] CE 13.22 report on angular mode," ISO/IEC JTC1/SC29/WG11 MPEG/m51594, Brussels, Belgium, January 2020). IDCM is a mode in which the positions of points within a node are explicitly (directly) signaled relative to a point within a node. In the angular coding mode, the positions of points may be signaled relative to an origin point of the node.

The angular coding mode may be used when the point cloud is generated based on data generated by a range-finding system, such as a LIDAR system. The LIDAR system may include a set of lasers arrayed in a vertical plane at different angles relative to an origin point. The LIDAR system may rotate around a vertical axis. The LIDAR system may use returned laser light to determine the distances and positions of points in the point cloud. The laser beams emitted by the lasers of a LIDAR system may be characterized by a set of parameters.

The following describes signaling of sensor laser beam parameters in w19088 for angular mode. The syntax elements that carry the LIDAR laser sensor information that may be required for the angular coding mode to have any coding efficiency benefits are indicated using <!> . . . </!> tags in Table 1, below. In Table 1, angular mode syntax elements are indicated with <!> . . . </!> tags in a geometry parameter set.

TABLE 1

| | Descriptor |
|---|---|
| geometry_parameter_set( ) { | |
| ... | ... |
|   geometry_planar_mode_flag | u(1) |
|   if( geometry_planar_mode_flag ){ | |
|     geom_planar_mode_th_idcm | ue(v) |

TABLE 1-continued

| | | Descriptor |
|---|---|---|
| | geom_planar_mode_th[ 1 ] | ue(v) |
| | geom_planar_mode_th[ 2 ] | ue(v) |
| } | | |
| <!> | geometry_angular_mode_flag </!> | u(1) |
| <!> | if( geometry_angular_mode_flag ){</!> | |
| <!> | lidar_head_position[0]</!> | se(v) |
| <!> | lidar_head_position[1]</!> | se(v) |
| <!> | lidar_head_position[2]</!> | se(v) |
| <!> | number_lasers</!> | ue(v) |
| <!> | for( i = 0; i < number_lasers; i++ ) {</!> | |
| <!> | laser_angle[ i ]</!> | se(v) |
| <!> | laser_correction[ i ]</!> | se(v) |
| <!> | }</!> | |
| <!> | planar_buffer_disabled</!> | u(1) |
| <!> | | se(v) |
| | implicit_qtbt_angular_max_node_min_dim_log2_to_split_z</!> | |
| <!> | implicit_qtbt_angular_max_diff_to_split_z</!> | se(v) |
| <!> | }</!> | |
| | neighbour_context_restriction_flag | u(1) |
| | inferred_direct_coding_mode_enabled_flag | u(1) |
| ... | | |

The semantics of these syntax elements are specified as follows in w19088:

geometry_planar_mode_flag equal to 1 indicates that the planar coding mode is activated. geometry_planar_mode_flag equal to 0 indicates that the planar coding mode is not activated.

geom_planar_mode_th_idcm specifies the value of the threshold of activation for the direct coding mode. geom_planar_mode_th_idcm is an integer in the range 0 to 127 inclusive. When not present, geom_planar_mode_th_idcm is inferred to be 127.

geom_planar_mode_th[i], for i in the range 0 . . . 2, specifies the value of the threshold of activation for planar coding mode along the i-th most probable direction for the planar coding mode to be efficient. geom_planar_mode_th[i] is an integer in the range 0 . . . 127.

geometry_angular_mode_flag equal to 1 indicates that the angular coding mode is activated. geometry_angular_mode_flag equal to 0 indicates that the angular coding mode is not activated.

lidar_head_position[ia], for is in the range 0 . . . 2, specifies the ia-th coordinate of the lidar head in the coordinate system associated with the internal axes. When not present, lidar_head_position[ia] is inferred to 0.

number_lasers specifies the number of lasers used for the angular coding mode. When not present, number_lasers is inferred to 0.

laser_angle[i], for i in the range 1 . . . number_lasers, specifies the tangent of the elevation angle of the i-th laser relative to the horizontal plane defined by the 0-th and the 1-th internal axes.

laser_correction [i], for i in the range 1 . . . number_lasers, specifies the correction, along the 2-th internal axis, of the i-th laser position relative to the lidar head position lidar_head_position[2]. When not present, laser_correction [i] is inferred to 0.

planar_buffer_disabled equal to 1 indicates that tracking the closest nodes using a buffer is not used in a process of coding the planar mode flag and the plane position in the planar mode. planar_buffer_disabled equal to 0 indicates that tracking the closest nodes using a buffer is used. When not present, planar_buffer_disabled is inferred to 0.

implicit_qtbt_angular_max_node_min_dim_log 2_to_split_z specifies the log 2 value of a node size below which horizontal split of nodes is preferred over vertical split. When not present, implicit_qtbt_angular_max_diff_to_split_z is inferred to 0.

implicit_qtbt_angular_max_diff_to_split_z specifies the log 2 value of the maximum vertical over horizontal node size ratio allowed to a node. When not present, implicit_qtbt_angular_max_node_min_dim_log 2_to_split_z is inferred to 0.

Only some nodes in an octree may be eligible to be coded using the angular mode. The following describes a process for determining node eligibility for angular mode in w19088. The process applies to a child node Child to determine the angular eligibility angular_eligible[Child] of the child node. In w19088, a syntax element geometry_angular_mode_flag indicates whether the angular mode is active. If geometry_angular_mode_flag is equal to 0, angular_eligible[Child] is set to equal to 0. Otherwise, the following applies:

```
midNodeX = 1 << (ChildNodeSizeXLog2 − 1)
midNodeY = 1 << (ChildNodeSizeXLog2 − 1)
xLidar = abs( ((xNchild − lidar_head_position[0] + midNodeX) << 8) − 128 )
yLidar = abs( ((yNchild − lidar_head_position[1] + midNodeY) << 8) − 128 )
rL1 = (xLidar + yLidar) >> 1
deltaAngleR = deltaAngle*rL1
midNodeZ = 1 << (ChildNodeSizeZLog2 − 1)
if (deltaAngleR <= (midNodeZ << 26))
    angular_eligible[Child] = 0
else
    angular_eligible[Child] = 1
``` where deltaAngle is the minimum angular distance between the lasers determined by:

deltaAngle=min{|laser_angle[$i$]−laser_angle[$j$]|;
 0≤$i$<$j$<number_lasers}, and where (xNchild, yNchild, zNchild) specifies the position of the geometry octree child node Child in the current slice.

The following process described in w19088 applies to a child node Child to determine the IDCM angular eligibility idcm4angular[Child] and the laser index laserIndex [Child]

associated with the child node. If the angular eligibility angular_eligible[Child] is equal to 0, then idcm4angular [Child] is set to 0 and laserIndex [Child] index is set to a pre-set value UNKNOWN LASER. Otherwise, if the angular eligibility angular_eligible[Child] is equal to 1, the following applies as a continuation of the process described in section 8.2.5.1 of w19088. Firstly, the inverse rInv of the radial distance of the child node from the Lidar is determined:

```
r2 = xLidar*xLidar + yLidar*yLidar
rInv = invSqrt (r2)
```

Then, an angle theta32 is determined for the child node:

```
zLidar = ((zNchild − lidar_head_position [2] + midNodeY) << 1) − 1
theta = zLidar*rInv
theta32 = theta >= 0 ? theta >> 15 : −((−theta) >> 15)
``` rInv may correspond to the inverse of the radial distance of the child node. The angle theta32 may correspond to a tangent of the elevation angle of a midpoint of the child node. Finally, the angular eligibility and the laser associated with the child node are determined as shown in Table 2, below, based on the parent node Parent of the child node:

TABLE 2

```
laserIndex [Child] = UNKNOWN_LASER
idcm4angular[Child] = 0
if (laserIndex [Parent] == UNKNOWN_LASER || deltaAngleR <=
(midNodeZ<< (26 + 2)))
{
    minDelta = 1 << (18 + 7)
    for (j = 0; j < number_lasers; j++) {
        delta = abs(laser_angle [j] − theta32)
        if (delta < minDelta) {
            minDelta = delta
            laserIndex [Child] = j
        }
    }
} else idcm4angular[Child] = 1
```

One type of angular mode enhancement for planar mode involves determination of a context contextAngular for planar coding mode. Specifically, the following process applies to a child node Child to determine the angular context contextAngular[Child] associated with the child node. If the laser index laserIndex[Child] is equal to UNKNOWN_LASER, then contextAngular[Child] is set to a pre-set value UNKNOWN_CONTEXT. Otherwise, if the laser index laserIndex [Child] is not equal to UNKNOWN_LASER, the following applies as a continuation of the process described in section 8.2.5.2 of w19088. Firstly, two angular differences m and M relative to a lower plane and an upper plane are determined.

```
thetaLaserDelta = laser_angle [laserIndex [Child]] − theta32
Hr = laser_correction [laserIndex [Child]] * rInv;
thetaLaserDelta += Hr >= 0 ? −(Hr >> 17) : ((−Hr) >> 17)
zShift = (rInv << (ChildNodeSizeZLog2 + 1)) >> 17
m = abs(thetaLaserDelta − zShift)
M = abs(thetaLaserDelta + zShift)
```

Then, the angular context is deduced from the two angular differences:

```
contextAngular[Child] = m > M ? 1 : 0
diff = abs(m − M)
if (diff >= rInv >> 15) contextAngular[Child] += 2;
if (diff >= rInv >> 14) contextAngular[Child] += 2;
if (diff >= rInv >> 13) contextAngular[Child] += 2;
if (diff >= rInv >> 12) contextAngular[Child] += 2;
```

The term thetaLaserDelta may be a laser difference angle determined by subtracting a tangent of the angle of the line passing through the center of the node from a tangent of an angle of the laser beam.

Another type of angular mode enhancement for IDCM described in w19088 involves determination of the angular context idcmIdxAngular. Specifically, a process to determine the context idcmIdxAngular[i][j] for coding the bin point_offset_z[i][j] associated with the j-th bit of the i-th point belonging to a child node that undergoes Inferred Direct Coding Mode is described as follows.

This process is performed after point_offset_x[i][ ] and point_offset_y[i][ ] are decoded such that PointOffsetX[i] and PointOffsetY[i] are known. The x and y position relative to the Lidar, of the point i is derived by:

```
posXlidar[i] = xNchild − lidar_head_position[0] + PointOffsetX[ i ]
posYlidar[i] = yNchild − lidar_head_position[1] + PointOffsetY[ i ]
``` where (xNchild, yNchild, zNchild) specify the position of the geometry octree child nodeChild in the current slice.

The inverse rInv of the radial distance of the point from the LIDAR is determined by:

```
xLidar = (posXlidar[i] << 8) − 128
yLidar = (posYlidar[i] << 8) − 128
r2 = xLidar*xLidar + yLidar*yLidar
rInv = invSqrt (r2)
```

The corrected laser angle ThetaLaser of the laser associated with the child nodeChild is deduced as follows:

```
Hr = laser_correction [laserIndex [Child]] * rInv
ThetaLaser = laser_angle [laserIndex [Child]] + (Hr >= 0 ? −(Hr >> 17) :
((−Hr) >> 17))
```

Assuming that the bits point_offset_z[i][j2] for j2 in the range 0 . . . j−1 are known, the point is known to belong to a virtual vertical interval whose half size is given by:

$$halfIntervalSize[j]=(1<<(EffectiveChildNodeSizeZLog2-1))>>j$$

and a partial z point position posZlidarPartial[i][j], that provides the lower end of the interval, is deduced by:

```
PointOffsetZpartial=0
```

```
for( j2 = 0; j2 < j; j2++ )
    PointOffsetZpartial [ i ] += point_offset_z[ i ][ j2 ] << j2
PointOffsetZpartial[ i ] <<= (EffectiveChildNodeSizeZLog2−j)
posZlidarPartial[i][j] = zNchild − lidar_head_position[2] +
PointOffsetZpartial[ i ]
```

A relative laser position thetaLaserDeltaVirtualInterval relative to the middle of the virtual interval is computed by:

```
zLidar = ((posZlidarPartial[i][j] + halfIntervalSize [j] ) << 1) - 1
theta = zLidar*rInv
theta32 = theta >= 0 ? theta >> 15 : -((-theta) >> 15)
thetaLaserDeltaVirtualInterval = ThetaLaser - theta32
```

Two absolute angular differences m and M of the laser relative to a lower and an upper z position in the virtual interval are determined:

```
zShift = ((rInv << EffectiveChildNodeSizeZLog2) >> 17) >> j
m = abs(thetaLaserDeltaVirtualInterval - zShift);
M = abs(thetaLaserDeltaVirtualInterval + zShift);
```

Then, the angular context is deduced from the two absolute angular differences:

```
idcmIdxAngular[i][j] = m > M ? 1: 0
diff = abs(m - M)
if (diff >= rInv >> 15) idcmIdxAngular[i][j] += 2
if (diff >= rInv >> 14) idcmIdxAngular[i][j] += 2
if (diff >= rInv >> 13) idcmIdxAngular[i][j] += 2
if (diff >= rInv >> 12) idcmIdxAngular[i][j] += 2
```

When IDCM is applied to a child node Child, the bits point_offset_z[i][j] of the i-th point in the child node, for j in the range 0 . . . EffectiveChildNodeSizeZLog2 or in the range 1 . . . EffectiveChildNodeSizeZLog2 in case the first bit is inferred by the plane position plane_position[Child] [2], are decoded applying the following process. If geometry_angular_mode_flag is equal to 0, then the bit point_offset_z[i][j] is decoded using the bypass decoding process. Otherwise, if geometry_angular_mode_flag is equal to 1, the bit point_offset_z[i][0] is bypass decoded when not inferred by the plane position, and the bits point_offset_z[i][j] are decoded using the context idcmIdxAngular[i][j] for j>0.

As specified above, the determination of the angular context indices for coding the planar mode's vertical plane position and for coding the IDCM vertical point position offsets involves significant complexity. Such complexity may present technical problems because the complexity may increase hardware costs, slow the coding process, and/or have other negative consequences. For example, 10 contexts are used for coding the planar mode's vertical plane position. In another example, 10 contexts are used for coding IDCM's vertical point position offsets per bin. In another example, 5 conditions based on comparisons of two large integer values are used to determine each context index. In another example, inverse square root distance computation is required (rInv in spec text above). In another example, the signaling of the number_lasers syntax element starts from the zero value, while there is at least one laser required for the angular mode. Furthermore, there are various inefficiencies in signaling angular mode syntax elements.

This disclosure describes techniques that may address one or more of these technical problems. The techniques and examples disclosed in this document may be applied independently or in combination.

In accordance with techniques of this disclosure, the number of contexts for coding the planar mode's vertical plane position is reduced. In the following descriptions, a laser, laser beam, laser sensor or sensor, or other similar terms may represent any sensor that can return a distance measure and a spatial orientation, including potentially an indication of time, for example, a typical LIDAR sensor.

A G-PCC coder (e.g., G-PCC encoder 200 or G-PCC decoder 300) may code the planar mode's vertical plane position in a node by selecting a laser index out of a set of laser candidates that are signaled in a parameter set, such as the geometry parameter set, with the selected laser index indicating the laser beam that intersects the node. The intersection of the laser beam with the node determines the context index to arithmetically code the planar mode's vertical plane position. In the following descriptions, this principle is referred to as angular mode coding.

Thus, in some examples, a G-PCC coder (e.g., G-PCC encoder 200 or G-PCC decoder 300) may code a vertical plane position of a planar mode in a node of an octree that represents 3-dimensional positions of points in the point cloud. For ease of explanation, this disclosure may refer to a node that the G-PCC coder is coding as a current node. As part of coding the vertical plane position of the planar mode, the G-PCC coder may determine a laser index of a laser candidate in a set of laser candidates. The determined laser index indicates a laser beam that intersects the current node. The set of laser candidates may include each of the lasers in a LIDAR array. In some examples, the set of laser candidates may be indicated in a parameter set, such as a geometry parameter set. Additionally, as part of coding the vertical plane position, the G-PCC coder determines a context index based on an intersection of the laser beam and the current node. For instance, the G-PCC coder may determine a context index based on whether the laser beam is above a first distance threshold, between the first distance threshold and a second distance threshold, between the second distance threshold and a third distance threshold, or below the third distance threshold. Furthermore, as part of coding the vertical plane position, the G-PCC coder arithmetically codes the vertical plane position of the planar mode using a context indicated by the determined context index.

There may be an eligibility condition to determine whether the planar mode's vertical plane position in the current node is eligible to be coded using the angular mode. If the vertical plane position is not eligible to be coded using the angular mode, the planar mode's vertical plane position may be coded without employing sensor information. In some examples, the eligibility condition may determine whether only one laser beam intersects the current node. In other words, the vertical plane position of the current node may be eligible to be coded using the angular mode if only one laser beam intersects the current node. In some examples, the eligibility condition may determine the minimum angle difference between the lasers out of the set of laser candidates. In other words, the current node may be eligible to be coded using the angular mode if the angle enveloping the current node is less than the minimum angle between laser beams. The angle enveloping the current node is an angle measured from the laser origin between a line passing through a far, bottom corner of the node and a line passing through a near, top corner of the node. When the angle enveloping the current node is less than the minimum angle difference between laser beams, only one laser beam intersects the node. In some examples, the eligibility condition is such that the vertical node dimension is smaller than (or equal to) the minimum angle difference. In other words, the current node may be eligible to be coded using the angular mode if the vertical dimension of the node is less than or equal to a vertical distance between laser beams separated by the minimum angle difference at the closest vertical edge of the current node to the laser origin.

As noted above, the G-PCC coder may select a laser index of a laser beam that intersects the current node. In some examples, the G-PCC coder may determine the index of the laser that intersects the current node by selecting a laser beam that is nearest to a marker point in the current node. In some examples, the marker point in the current node may be the center point of the current node with coordinates at half of all three dimensions of the current node (for example, cube or cuboid dimensions). In other examples, the marker point in the current node may be any other point that is part of the current node, such as any point within the node or on the node sides, or on the node edges, or node corners.

The G-PCC coder may determine whether a laser is near the marker point based on comparing angular differences of the candidate lasers. For example, the G-PCC coder may compare differences between angles of the laser beams and an angle of the marker point. The angles of the laser beams may be defined as being between the horizontal plane (z=0) and the direction of the laser beam. The angle of the marker point may be defined as being between the horizontal plane and the direction of a virtual beam to the marker point. The origin in this case may be collocated with the center of the sensor or laser. Alternatively, in some examples, mathematical functions or trigonometric functions such as the tangent may be applied to the angles before the comparison.

In some examples, the G-PCC coder may determine whether a laser is near the marker point based on a comparison of vertical coordinate differences. For example, the G-PCC coder may compare the marker point's vertical coordinate with respect to the sensor origin (e.g., the z-coordinate of the marker point) and the vertical coordinate of the laser intersection with the node. The G-PCC coder may obtain the vertical coordinate of the laser intersection with the node by multiplying the tangent of the angle between the horizontal plane and the laser direction with a distance computed by taking a Euclidean distance based on the (x,y) coordinates of the marker point (trigonometry).

In some examples, the G-PCC coder may determine a context index to use to code a vertical plane position syntax element based on a relative position of the laser beam and the marker point. For example, the G-PCC coder may determine that a context index is a first context index if the laser beam is above the marker point and may determine that the context index is a second context index if the laser beam is below the marker point. The G-PCC coder may determine whether the laser beam is above or below the marker point in a similar fashion as determining a laser beam index that intersects with the node, e.g., by comparing angular differences, comparing differences of tangent of angle values, or comparing vertical coordinate differences.

In some examples, as part of determining the context index, the G-PCC coder may determine distance threshold values. The G-PCC coder may use the distance threshold values to compare the distance between the laser beam and the marker point. The distance threshold values may divide a distance range within the current node into intervals. The intervals may be of equal or unequal lengths. Each interval of the intervals may correspond to a context index if the laser beam is within the distance range determined by the distance intervals. In some examples, there are two distance thresholds determined by equal distance offsets above and below the marker point, which define three distance intervals that correspond with three context indexes. The G-PCC coder may determine whether the laser beam belongs to an interval in a similar fashion as determining the laser beam index of a laser that intersects with the node (e.g., by comparing angular differences, comparing differences of tangent of angle values, or comparing vertical coordinate differences).

The above principles, which employ sensor information, are not limited to coding the planar mode's vertical (Z) plane position syntax element within a node, but similar principles may also be applied to coding the planar mode's X or Y plane position syntax elements within a node. The planar mode's X or Y plane position modes may be chosen by an encoder if they are more appropriate to code the point distribution within the node. For instance, if occupied child nodes are all on one side of a plane oriented in the X direction, an X plane position syntax element may be used to code the point distribution within the node. If occupied child nodes are all on one side of a plane oriented in the Y direction, a Y plane position syntax element may be used to code the point distribution within the node. Additionally, combinations of two or more planes oriented in the X, Y, or Z directions may be used to indicate occupancy of child nodes.

Figure 5:
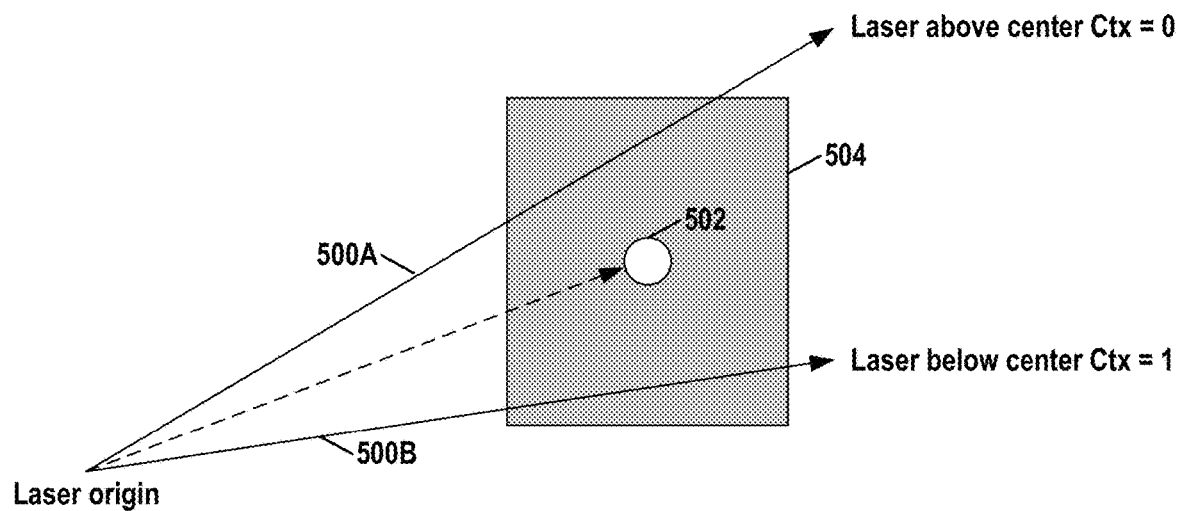
FIG. 5 is a conceptual diagram of an example in which a context index is determined based on laser beam positions above or below a marker point of a node, in accordance with one or more techniques of this disclosure.

The G-PCC coder may determine a context from among two contexts based on whether the laser beam is above or below the marker point (i.e., is positioned above or below the marker point). In this example, the marker point is the center of the node. This is illustrated in FIG. 5. More specifically, FIG. 5 is a conceptual diagram of an example in which a context index is determined based on laser beam positions 500A, 500B above or below a marker point 502 of a node 504, in accordance with one or more techniques of this disclosure. Thus, in the example of FIG. 5, if the laser that intersects node 504 is above marker point 502, as shown with respect to laser beam position 500A, the G-PCC coder selects a first context index (e.g., Ctx=0). In the example of FIG. 5, marker point 502 is located at a center of node 504. If the laser that intersects node 504 is below marker point 502, as shown with respect to laser beam position 500B, the G-PCC coder selects a second context index (e.g., Ctx=1).

As discussed in above, w19088 describes a context determination method that involves determination of a context contextAngular for planar coding mode. The text of w19088 associated with this context determination method is reproduced in Table 3, below. More specifically, Table 3 shows the specification text of w19088 for determining a context index out of a set of 10 possible context indexes. The context determination method provided in w19088 evaluates five conditions based on comparisons of large integer values to determine the context index in the range 0 to 9. These comparisons are indicated with <!> . . . </!> tags in Table 3.

TABLE 3

Firstly, two angular differences m and M relative to a lower plane and an upper plane are determined.
thetaLaserDelta = laser_angle [laserIndex [Child]] − theta32
Hr = laser_correction [laserIndex [Child]] * rInv
thetaLaserDelta += Hr >= 0 ? −(Hr >> 17) : ((−Hr) >> 17)
zShift = (rInv << (ChildNodeSizeZLog2 + 1)) >> 17
m = abs(thetaLaserDelta − zShift)
M = abs(thetaLaserDelta + zShift)
Then, the angular context is deduced from the two angular differences.
contextAngular[Child] = <!>m > M ?</!> 1 : 0
diff = abs(m − M)
<!>if (diff >= rInv >> 15)</!> contextAngular[Child] += 2
<!>if (diff >= rInv >> 14)</!> contextAngular[Child] += 2
<!>if (diff >= rInv >> 13)</!> contextAngular[Child] += 2
<!>if (diff >= rInv >> 12)</!> contextAngular[Child] += 2

The simplified two-context derivation proposed in this disclosure is specified in Table 4, below. More specifically, Table 4 shows an example proposed simplified two-context derivation. The number of conditions is reduced to one, which is indicated with <!> . . . </!> tags. This single condition may be easy to implement because the single condition may be to only check the sign of an integer value.

TABLE 4

Firstly, the corrected angular difference relative to the center of the node is determined.
thetaLaserDelta = laser_angle [laserIndex [Child]] – theta32
Hr = laser_correction [laserIndex [Child]] * rInv
thetaLaserDelta += Hr >= 0 ? –(Hr >> 17) : ((–Hr) >> 17)
Then, the angular context is deduced from the sign of thetaLaserDelta.
contextAngular[Child] = 0
<!>if (thetaLaserDelta < 0)</!> contextAngular[Child] = 1

In Table 4, and elsewhere in this disclosure, laserIndex [Child] is an index of a laser beam that is determined to be closest to the center point of a node "Child"; laser angle indicates a tangent of an angle of the laser beam determined to be closest to the center point of the node "Child"; thetaLaserDelta indicates the difference between a tangent of the angle of the laser beam determined to be closest to the center point of the node "Child" (theta32) and an offset correction; laser_correction indicates a laser correction factor; Hr indicates a tangent of an angle corresponding to vertical offset correction, contextAngular indicates a context; and theta32 may be determined as described elsewhere in this disclosure. The operation thetaLaserDelta+=Hr>=0?–(Hr>>17): ((–Hr)>>17) provides a precision adjustment.

Figure 6:
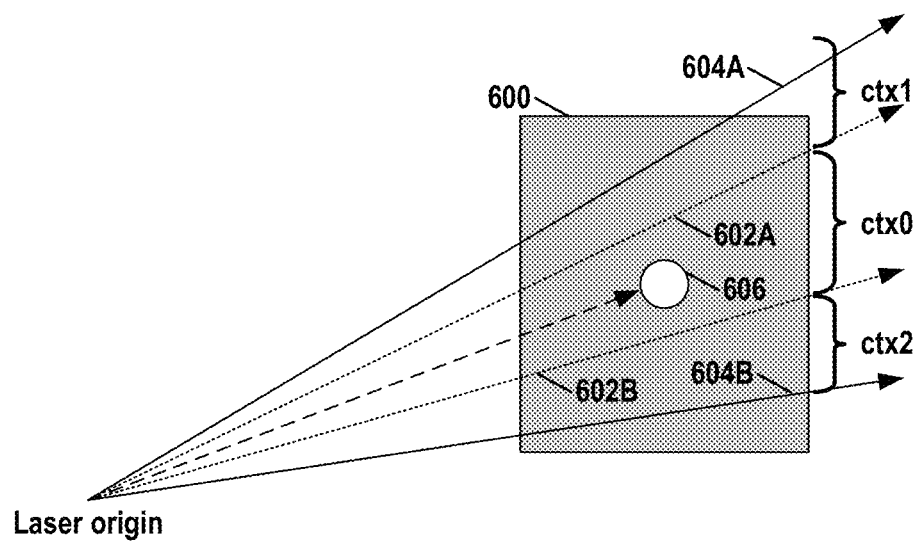
FIG. 6 is a conceptual diagram illustrating an example three-context index determination.

In some examples, the G-PCC coder determines three contexts based on the laser beam being positioned above or below two distance thresholds, or in between the distance thresholds. In this example, the marker point is the center of the node. This is illustrated in FIG. 6. More specifically, FIG. 6 is a conceptual diagram illustrating an example three-context index determination for a node 600, in accordance with one or more techniques of this disclosure. In FIG. 6, the distance interval thresholds are indicated with fine-dotted lines 602A, 602B. Laser beams are indicated with solid lines 604A, 604B. Each of these laser beams may be a laser candidate. A center point 606 (marker point) is indicated with a white circle. Thus, in the example of FIG. 6, if a laser (such as the laser corresponding to line 604A) is above line 602A, the G-PCC coder selects the context index ctx1. If a laser is between lines 602A, 602B, the G-PCC coder may select the context index ctx0. If a laser (such as the laser corresponding to line 604B) is below line 602B, the G-PCC coder may select the context index ctx2.

The simplified specification text is provided in Table 5, below. More specifically, Table 5 shows a proposed simplified three-context derivation. In this example, the G-PCC coder uses two conditions, which may be easy to implement because the conditions only check the signs of integer values.

TABLE 5

Firstly, two angular differences m and M relative to a lower plane and an upper plane are determined.
thetaLaserDelta = laser_angle [laserIndex [Child]] – theta32
Hr = laser_correction [laserIndex [Child]] * rInv
thetaLaserDelta += Hr >= 0 ? –(Hr >> 17) : ((–Hr) >> 17)
zShift = (rInv << ChildNodeSizeZLog2) >> 20
DeltaBottom = thetaLaserDelta + zShift
DeltaTop = thetaLaserDelta – zShift
Then, the angular context is deduced.
contextAngular[Child] = 0
<!>if (DeltaTop >= 0)</!> contextAngular[Child] = 1
<!>else if (DeltaBottom < 0)</!> contextAngular[Child] = 2

In Table 5, and elsewhere in this disclosure, ChildNodeSizeZLog2 is the log base 2 of a height (z-distance) of the node Child. DeltaTop may be a top angle difference determined by subtracting a shift value from the laser difference angle. DeltaBottom may be a bottom angle difference by adding the shift value to the laser difference angle. The term zShift may be based on an angle between top and bottom corners of the node Child and scaled to a smaller interval.

Figure 7:
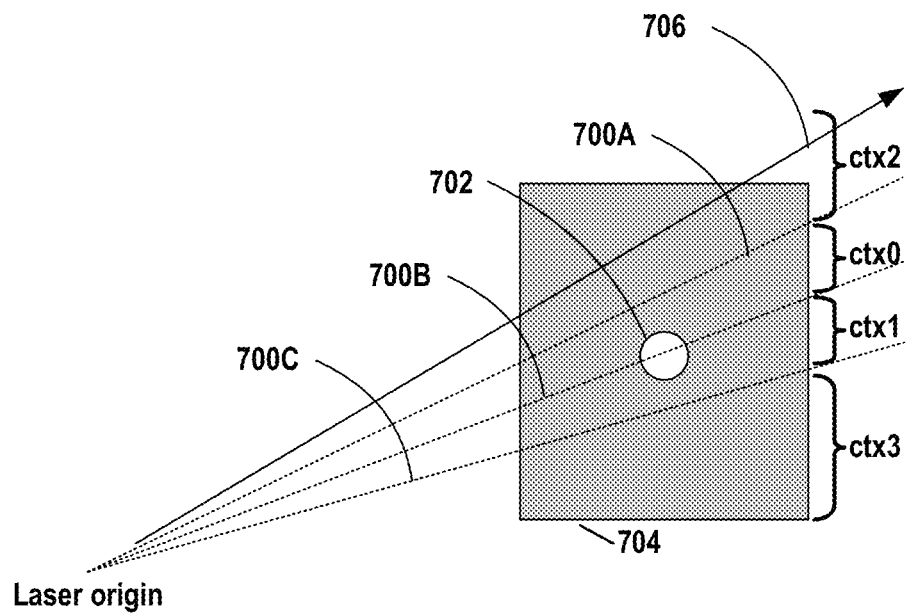
FIG. 7 is a conceptual diagram illustrating an example context index determination for coding a planar mode's vertical plane position based on a laser beam position with intervals separated by finely dotted lines.

In some examples, the G-PCC coder uses four contexts for coding the planar mode's vertical plane position in the case that the angular mode is used. In such examples, the G-PCC coder may determine the context index based on a laser beam's position within four intervals. This example is illustrated in FIG. 7. FIG. 7 is a conceptual diagram illustrating an example context index determination for coding a planar mode's vertical plane position (angular mode) based on a laser beam position (solid arrow) with intervals separated by finely dotted lines. In the example of FIG. 7, lines 700A, 700B, and 700C correspond to distance interval thresholds. Furthermore, in the example of FIG. 7, a marker point 702 is located at a center of node 704. Line 706 corresponds to a laser beam that intersects node 704. Because line 706 is above line 700A, the G-PCC coder may select a context index, ctx2, for use in coding the vertical plane position.

The proposed simplified four-context derivation is specified in Table 6, below. The number of conditions is reduced to three, which are indicated with <!> . . . </!> tags. These conditions may be simple to implement because they only check the sign of an integer value. Table 6 shows example specification text of a proposed simplified four-context derivation for coding planar mode's vertical plane position (angular mode case).

TABLE 6

...
Firstly, the corrected angular difference relative to the center of the node is determined.
thetaLaserDelta = laser_angle [laserIndex [Child]] – theta32
Hr = laser_correction [laserIndex [Child]] * rInv
thetaLaserDelta += Hr >= 0 ? –(Hr >> 17) : ((–Hr) >> 17)
Then, the angular context is deduced.
zShift = (rInv << ChildNodeSizeZLog2) >> 20
DeltaBottom = thetaLaserDelta + zShift
DeltaTop = thetaLaserDelta – zShift
contextAngular[Child] = <!>thetaLaserDelta >= 0</!> ? 0 : 1
if (<!>DeltaTop >= 0</!>) contextAngular[Child] += 2
else if (<!>DeltaBottom < 0</!>) contextAngular[Child] += 2
...

FIG. 8A is a flowchart illustrating an example operation for encoding a vertical plane position in accordance with one or more techniques of this disclosure. G-PCC encoder 200 may perform the operation of FIG. 8A as part of encoding a point cloud.

In the example of FIG. 8A, G-PCC encoder 200 (e.g., arithmetic encoding unit 214 of G-PCC encoder 200 (FIG. 2) may encode a vertical plane position of a planar mode in a node of a tree (e.g., an octree) that represents 3-dimensional positions of points in a point cloud represented by point cloud data (800). In other words, G-PCC encoder 200 may encode the vertical plane position.

As part of encoding the vertical plane position of the planar mode, G-PCC encoder 200 (e.g., arithmetic encoding unit 214) may determine a laser index of a laser candidate in a set of laser candidates, wherein the determined laser index indicates a laser beam that intersects the node (802). G-PCC encoder 200 may determine the laser index in accordance with any of the examples provided elsewhere in this disclosure. For example, G-PCC encoder 200 may determine the laser index as shown in Table 2, above.

Additionally, G-PCC encoder 200 (e.g., arithmetic encoding unit 214) may determine a context index (contextAngular) based on whether the laser beam is above a first distance threshold, between the first distance threshold and a second distance threshold, between the second distance threshold and a third distance threshold, or below the third distance threshold (804). For instance, in the example of FIG. 7, G-PCC encoder 200 may determine the context index based on whether the laser beam is above a first distance threshold (corresponding to line 700A), between the first distance threshold and a second distance threshold (corresponding to line 700B), between the second distance threshold and a third distance threshold (corresponding to line 700C), or below the third distance threshold. In some examples, to determine the position of the laser beam relative to the first, second, and third distance thresholds, G-PCC encoder 200 may determine a laser difference angle (e.g., thetaLaserDelta) by subtracting a tangent of the angle of the line passing through the center of the node from a tangent of an angle of the laser beam, determine a top angle difference (e.g., DeltaTop) by subtracting a shift value from the laser difference angle; and determine a bottom angle difference (e.g., DeltaBottom) by adding the shift value to the laser difference angle.

G-PCC encoder 200 may perform a first comparison that determines whether the laser difference angle is greater than or equal to 0 (e.g., thetaLaserDelta>=0). G-PCC encoder 200 may set the context index to 0 or 1 based on whether the laser difference angle is greater than or equal to 0 (e.g., contextAngular[Child]=thetaLaserDelta>=0?0:1. Additionally, G-PCC encoder 200 may perform a second comparison (e.g., DeltaTop>=0) that determines whether the top angle difference is greater than or equal to 0. The laser beam is above the first distance threshold when the top angle difference is greater than or equal to 0. G-PCC encoder 200 may also perform a third comparison (e.g., DeltaBottom<0) that determines whether the bottom angle difference is less than 0. The laser beam is below the third distance threshold when the bottom angle difference is less than 0. G-PCC encoder 200 may increment the context index by 2 based on the top angle difference being greater than or equal to 0 (e.g., if (DeltaTop>=0) contextAngular[Child]+=2) or based on the bottom angle difference being less than 0 (e.g., else if (DeltaBottom<0) contextAngular[Child]+=2).

G-PCC encoder 200 (e.g., arithmetic encoding unit 214 of G-PCC encoder 200) may arithmetically encode the vertical plane position of the planar mode using a context indicated by the determined context index (806). For example, G-PCC encoder 200 may perform CABAC encoding on a syntax element indicating the vertical plane position.

FIG. 8B is a flowchart illustrating an example operation for decoding a vertical plane position in accordance with one or more techniques of this disclosure. G-PCC decoder 300 may perform the operation of FIG. 8B as part of reconstructing a point cloud represented by point cloud data. In the example of FIG. 8B, G-PCC decoder 300 (e.g., geometry arithmetic decoding unit 302 of FIG. 3) may decode a vertical plane position of a planar mode in a node of a tree (e.g., an octree) that represents 3-dimensional positions of points in the point cloud (850). In other words, G-PCC decoder 300 may decode the vertical plane position.

As part of decoding the vertical plane position of the planar mode, G-PCC decoder 300 (e.g., geometry arithmetic decoding unit 302) may determine a laser index of a laser candidate in a set of laser candidates, wherein the determined laser index indicates a laser beam that intersects the node (852). G-PCC decoder 300 may determine the laser index in accordance with any of the examples provided elsewhere in this disclosure. For example, G-PCC decoder 300 may determine the laser index as shown in Table 2, above.

Additionally, G-PCC decoder 300 may determine a context index (contextAngular) based on whether the laser beam is above a first distance threshold, between the first distance threshold and a second distance threshold, between the second distance threshold and a third distance threshold, or below the third distance threshold (804). G-PCC decoder 300 may determine the context index in the same manner as G-PCC encoder 200, as described above.

G-PCC decoder 300 (e.g., geometry arithmetic decoding unit 302 of G-PCC decoder 300) may arithmetically decode the vertical plane position of the planar mode using a context indicated by the determined context index (806). For example, G-PCC decoder 300 may perform CABAC decoding on a syntax element indicating the vertical plane position. In some examples, G-PCC decoder 300 may determine positions of one or more points in the point cloud based on the vertical plane position. For instance, G-PCC decoder 300 may determine, based on the vertical plane position, locations of occupied child nodes of a node. G-PCC decoder 300 may then process the occupied child nodes to determine positions of points within the occupied child nodes and may not need to perform further processing on the unoccupied child nodes.

As mentioned above, the one or more techniques of this disclosure may reduce the number of contexts for coding IDCM vertical point position offsets. A G-PCC coder (e.g., G-PCC encoder 200 or G-PCC decoder 300) may code (i.e., encode or decode) a IDCM's vertical point position offset within a node in part by selecting a laser index out of a set of laser candidates. The set of laser candidates may be signaled in a parameter set, such as the geometry parameter set, with the selected laser index indicating the laser beam that intersects the node. The set of laser candidates may correspond to lasers in a LIDAR array. The G-PCC coder may determine the context indexes to arithmetically code the bins (bits) from the IDCM's vertical point position offset based on the intersection of a laser beam with a node.

Thus, in some examples, a G-PCC coder (e.g., G-PCC encoder 200 or G-PCC decoder 300) may code a vertical point position offset within a node of a tree (e.g., an octree) that represents 3-dimensional positions of points in the point cloud. As part of coding the vertical point position offset, the G-PCC coder may determine a laser index of a laser candidate in a set of laser candidates. The determined laser index indicates a laser beam that intersects the node. Additionally, as part of coding the vertical position offset, the G-PCC coder may determine a context index based on an intersection of the laser beam and the node. The G-PCC coder may arithmetically code bins of the vertical point position offset using a context indicated by the determined context index.

In some examples, there may be an eligibility condition that the G-PCC coder may use to determine whether a node is eligible for using the angular mode to code the IDCM's vertical point position offset. If the vertical point position offset is not eligible to be coded in the node using the angular mode, the G-PCC coder may code the IDCM's vertical point position offset without employing sensor information. In some examples, the eligibility condition may determine whether only one laser intersects the node. In other words, the G-PCC coder may determine that the vertical point offset is eligible to be coded in the node using the angular mode if only one laser intersects the node.

In some examples, the eligibility condition may determine the minimum angle difference between the lasers out of the set of laser candidates. In other words, the G-PCC coder may determine that the vertical point offset is eligible to be coded in the node using the angular mode if there is at least a minimum angle between lasers in the set of laser candidates. In some examples, the eligibility condition is such that the vertical node dimension is smaller than (or equal to) the minimum angle difference. In other words, the G-PCC coder may determine that the vertical point offset is eligible to be coded in the node using the angular mode if the vertical node dimension is less than or equal to the minimum angle difference. In other words, the current node may be eligible to be coded using the angular mode if the vertical dimension of the node is less than or equal to a vertical distance between laser beams separated by the minimum angle difference at the closest vertical edge of the current node to the laser origin.

In some examples, the G-PCC coder determines the index of the laser that intersects the node by selecting a laser beam that is nearest to a marker point in the node. The marker point in the node may be the center point of the node, for example, with coordinates at half of all three dimensions of the node (for example cube or cuboid dimensions), or any other point that is part of the node, such as any point within the node or on the node sides, or on the node edges, or node corners.

The G-PCC coder may determine whether a laser is near the marker point based on a comparison of angular differences. For example, the G-PCC coder may compare the difference between the angles of the laser beams and an angle of the marker point. The angles of the laser beams may be defined as being between the horizontal plane (z=0) and the direction of the laser beam. The angle of the marker point may be defined as being the angle between the horizontal plane and the direction of a virtual beam to the marker point. In this case, the origin may be collocated with the center of the sensor or laser. Alternatively, mathematical functions or trigonometric functions such as the tangent function may be applied to the angles before the comparison.

In some examples, the G-PCC coder may determine whether a laser is near the marker point based on a comparison of vertical coordinate differences. For example, the G-PCC coder may compare the marker point's vertical coordinate with respect to the sensor origin (e.g., the z-coordinate of the marker point) and the vertical coordinate of the laser intersection with the node. The G-PCC coder may obtain the vertical coordinate of the laser intersection with the node by multiplying the tangent of the angle between the horizontal plane and the laser direction with the distance computed by taking the Euclidean distance based on the (x,y) coordinates of the marker point (trigonometry).

In some examples, the G-PCC coder may determine the context index to code (e.g., CABAC code) the j-th bit of the IDCM's vertical point position offset within the node based on the relative position of the laser beam with respect to a vertical interval within the node corresponding with the j-th bit. The encoding or decoding of the vertical point position offset bits is in an order, such as from most-significant bit (MSB) to least-significant bit (LSB). In examples where the vertical point position offset bits are coded in the order of MSB to LSB, the maximum value of the vertical point position offset and, therefore, also the MSB, is determined by the value of the vertical node size.

The G-PCC coder may determine that the context index is a first context index if the laser beam is above the mid-point of the vertical interval corresponding with the j-th bit. The G-PCC coder may determine that the context index is a second context index if the laser beam is below the mid-point. The G-PCC coder may determine whether the laser beam is above or below the mid-point in a similar fashion as determining the laser beam index of a laser beam that intersects with the node, e.g., by comparing angular difference, comparing differences of tangents of angle values, or comparing vertical coordinate differences.

The G-PCC coder may determine distance threshold values and use the distance threshold values to compare the distance between the laser beam and the mid-point in order to determine the context index. In some examples, the distance threshold values may divide an interval range, corresponding with the j-th bit, within the node into subintervals. The subintervals may be of equal or unequal lengths. Each subinterval may correspond to a context index if the laser beam is within the distance range determined by the distance subintervals. In some examples, there are two distance thresholds determined by equal distance offsets above and below the mid-point. Therefore, in such examples, there may be three distance intervals that correspond with three context indexes. The G-PCC coder may determine whether the laser beam belongs to a subinterval in a similar fashion as determining the laser beam index that intersects with the node, i.e., by comparing angular difference, comparing difference of tangent of angle values, or comparing vertical coordinate difference.

The above principles, which employ sensor information, are not limited to coding the IDCM's vertical (Z) point position offset within a node, but similar principles may also be applied to coding the X or Y point position offsets within a node.

Figure 9:
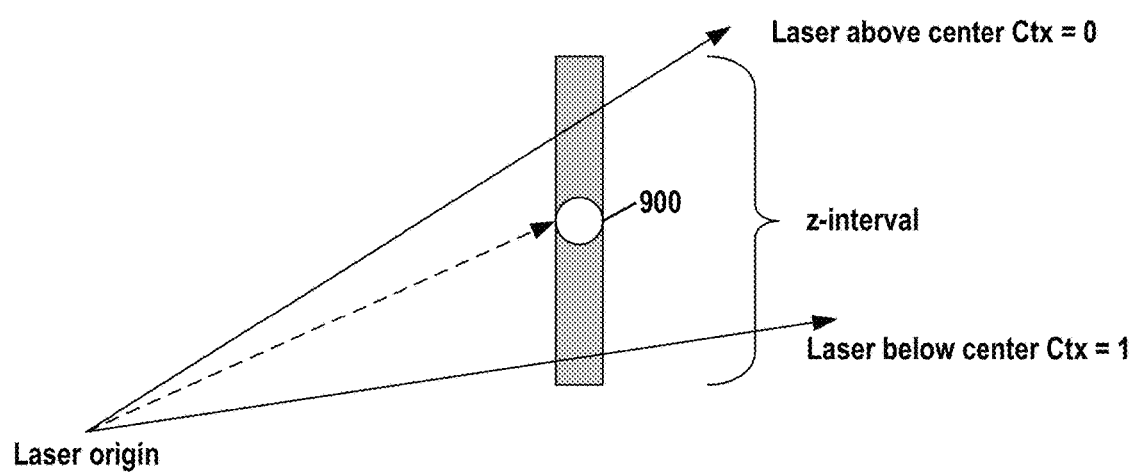
FIG. 9 is a conceptual diagram of an example for determining a context index based on laser beam positions above or below the interval mid-point.

In some examples, the G-PCC coder determines a context from among two contexts based on a laser beam being positioned above or below the marker point in the interval. In this example, the mid-point is the center of the interval. This is illustrated in FIG. 9. More specifically, FIG. 9 is a conceptual diagram of an example for determining a context index (e.g., Ctx=0 or Ctx=1) based on laser beam positions (solid lines) being above or below the interval mid-point 900 indicated with a white circle.

As discussed above, w19088 describes a context determination method that involves determination of an angular context idcmIdxAngular. The corresponding text in w19088 is reproduced in Table 7, below, for convenience. Table 7 shows text for determining the context index for coding IDCM vertical position offset bins. As shown in Table 7, the G-PCC coder evaluates five conditions to determine the context index in the range 0 to 9. The five conditions are based on comparisons of large integer values. In Table 7, the conditions are indicated by <!> . . . </!> tags.

TABLE 7

A relative laser position thetaLaserDeltaVirtualInterval relative to the middle of the virtual interval is computed by:
    zLidar = ((posZlidarPartial[i][j] + halfIntervalSize [j]) << 1) − 1
    theta = zLidar*rInv
    theta32 = theta >= 0 ? theta >> 15 : −((−theta) >> 15)
    thetaLaserDeltaVirtualInterval = ThetaLaser − theta32
Two absolute angular differences m and M of the laser relative to a lower and an upper z position in the virtual interval are determined:
    zShift = ((rInv << EffectiveChildNodeSizeZLog2) >> 17) >> j
    m = abs(thetaLaserDeltaVirtualInterval − zShift)
    M = abs(thetaLaserDeltaVirtualInterval + zShift)

TABLE 7-continued

Then, the angular context is deduced from the two absolute angular differences:
    idcmIdxAngular[i][j] = <!>m > M</!> ? 1: 0
    diff = abs(m − M)
    <!>if (diff >= rInv >> 15)</!> idcmIdxAngular[i][j] += 2
    <!>if (diff >= rInv >> 14)</!> idcmIdxAngular[i][j] += 2
    <!>if (diff >= rInv >> 13)</!> idcmIdxAngular[i][j] += 2
    <!>if (diff >= rInv >> 12)</!> idcmIdxAngular[i][j] += 2

In Table 7, and elsewhere in this disclosure, zLidar indicates a midpoint in a current interval corresponding to the bit being coded. posZlidarPartial[i][j] is 0 when the most-significant bit (i.e., bit 0) is being coded, equal to halfIntervalSize when bit 1 is being coded, and the posZlidarPartial value for each subsequent bit is equal to half of the posZlidarPartial value of the previous bit. halfIntervalSize[j] and zLidar are defined above. EffectiveChildNodeSizeZLog2 indicates a log base-2 of a vertical node size.

A simplified two-context derivation proposed in this disclosure is specified in Table 8, below. More specifically, Table 8 shows a simplified specification text to determine a two-context index. The number of conditions is reduced to one, which is indicated with <!> . . . </!> tags. This single condition may be easy to implement because the single condition may be to only check the sign of an integer value.

TABLE 8

A relative laser position thetaLaserDeltaVirtualInterval relative to the middle of the virtual interval is computed by:
    zLidar = ((posZlidarPartial[i][j] + halfIntervalSize [j]) << 1) − 1
    theta = zLidar*rInv
    theta32 = theta >= 0 ? theta >> 15 : −((−theta) >> 15)
    thetaLaserDeltaVirtualInterval = ThetaLaser − theta32
Then, the angular context is deduced from the sign of thetaLaserDeltaVirtualInterval.
idcmIdxAngular[i][j] = 0
<!>if (thetaLaserDeltaVirtualInterval < 0)</!> idcmIdxAngular[i][j] = 1

Figure 10:
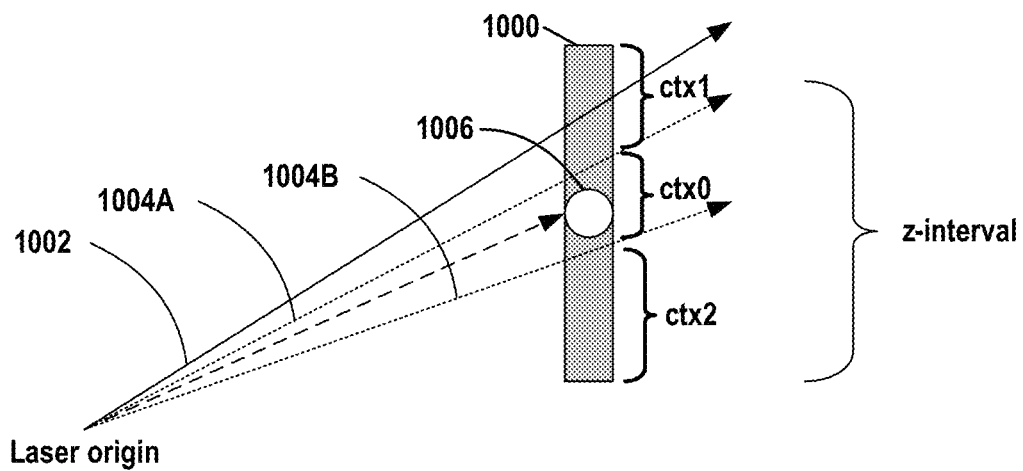
FIG. 10 is a conceptual diagram illustrating an example Inferred Direct Coding Mode (IDCM) vertical point offset interval corresponding with j-th bit divided into three sub-intervals.

In some examples, the G-PCC coder determines three contexts based on the laser beam being positioned above or below two distance thresholds, or in between the distance thresholds. In this example, the marker point is the center of the interval. This is illustrated in FIG. 10. More specifically, FIG. 10 is a conceptual diagram illustrating an example IDCM vertical point offset interval corresponding with j-th bit (1000) divided into three subintervals. In the example of FIG. 10, a laser beam 1002 is shown with a solid line and thresholds are shown with fine-dashed lines 1004A, 1004B, and a mid-point 1006 is indicated by a white circle. Because laser beam 1002 is above line 1004A, the G-PCC coder may select the context index ctx1.

The simplified specification text is specified in Table 9, below. More specifically, Table 9 below shows a simplified specification text for a three-context example. In this example, two conditions are used, which may be easy to implement, because the conditions only check the signs of integer values. The conditions are indicated with <!> . . . </!> tags.

TABLE 9

A relative laser position thetaLaserDeltaVirtualInterval relative to the middle of the virtual interval is computed by:
zLidar = ((posZlidarPartial[i][j] + halfIntervalSize [j]) << 1) − 1
theta = zLidar*rInv
theta32 = theta >= 0 ? theta >> 15 : −((−theta) >> 15)
thetaLaserDeltaVirtualInterval = ThetaLaser − theta32

TABLE 9-continued

Then, the angular context is deduced.
zShift = ((rInv << EffectiveChildNodeSizeZLog2) >> 20) >> j
DeltaBottom = thetaLaserDeltaVirtualInterval + zShift
DeltaTop = thetaLaserDeltaVirtualInterval − zShift
idcmIdxAngular[i][j] = 0
<!>if (DeltaTop >= 0)</!> idcmIdxAngular[i][j] = 1
<!>else if (DeltaBottom < 0)</!> idcmIdxAngular[i][j] = 2

Figure 11:
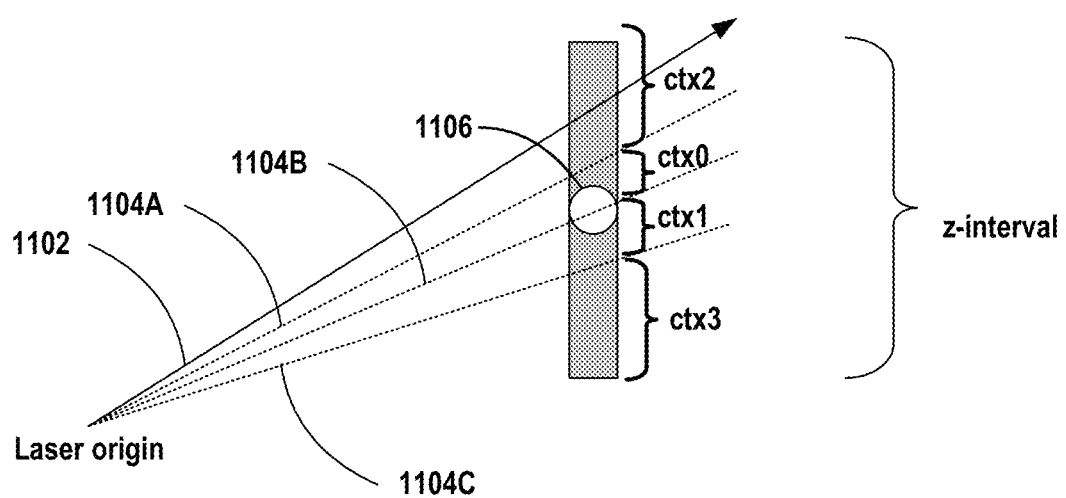
FIG. 11 is a conceptual diagram illustrating an example technique for determining a context index for coding IDCM's vertical point position offsets based on a laser beam position within intervals.

In some examples, in the IDCM case, the G-PCC coder determines a context from among four contexts based on a laser beam's position within similar intervals. This is illustrated in the example of FIG. 11. FIG. 11 is a conceptual diagram illustrating an example technique for determining a context index for coding IDCM's vertical point position offsets based on a laser beam position (solid arrow) 1102 within intervals indicated by finely dashed lines 1104A, 1104B, 1104C. In the example of FIG. 11, a mid-point 1106 is indicated by a white circle. Because laser beam 1102 is above line 1104A, the G-PCC coder may select the context index ctx2.

The proposed simplified four-context derivation is specified in Table 10, below. The number of conditions is reduced to three, which are indicated with <!> . . . </!> tags. These conditions may be simple to implement because they only check the sign of an integer value. Table 10 includes specification text of a proposed simplified four-context derivation for coding IDCM vertical point position offsets (angular mode case).

TABLE 10

...
A relative laser position thetaLaserDeltaVirtualInterval relative to the middle of the virtual interval is computed by:
    zLidar = ((posZlidarPartial[i][j] + halfIntervalSize [j]) << 1) − 1
    theta = zLidar*rInv
    theta32 = theta >= 0 ? theta >> 15 : −((−theta) >> 15)
    thetaLaserDeltaVirtualInterval = ThetaLaser − theta32
Then, the angular context is deduced based on thetaLaserDeltaVirtualInterval.
zShift = ( ( rInv << ChildNodeSizeZLog2) >> 18 ) >> j
DeltaBottom = thetaLaserDeltaVirtualInterval + zShift
DeltaTop = thetaLaserDeltaVirtualInterval − zShift
idcmIdxAngular[i][j] = <!>thetaLaserDeltaVirtualInterval >= 0</!> ? 0 : 1
if (<!>DeltaTop >= 0</!>) idcmIdxAngular[i][j] += 2
Else if (<!>DeltaBottom < 0</!>) idcmIdxAngular[i][j] += 2
...

Figures 12A, 12B:
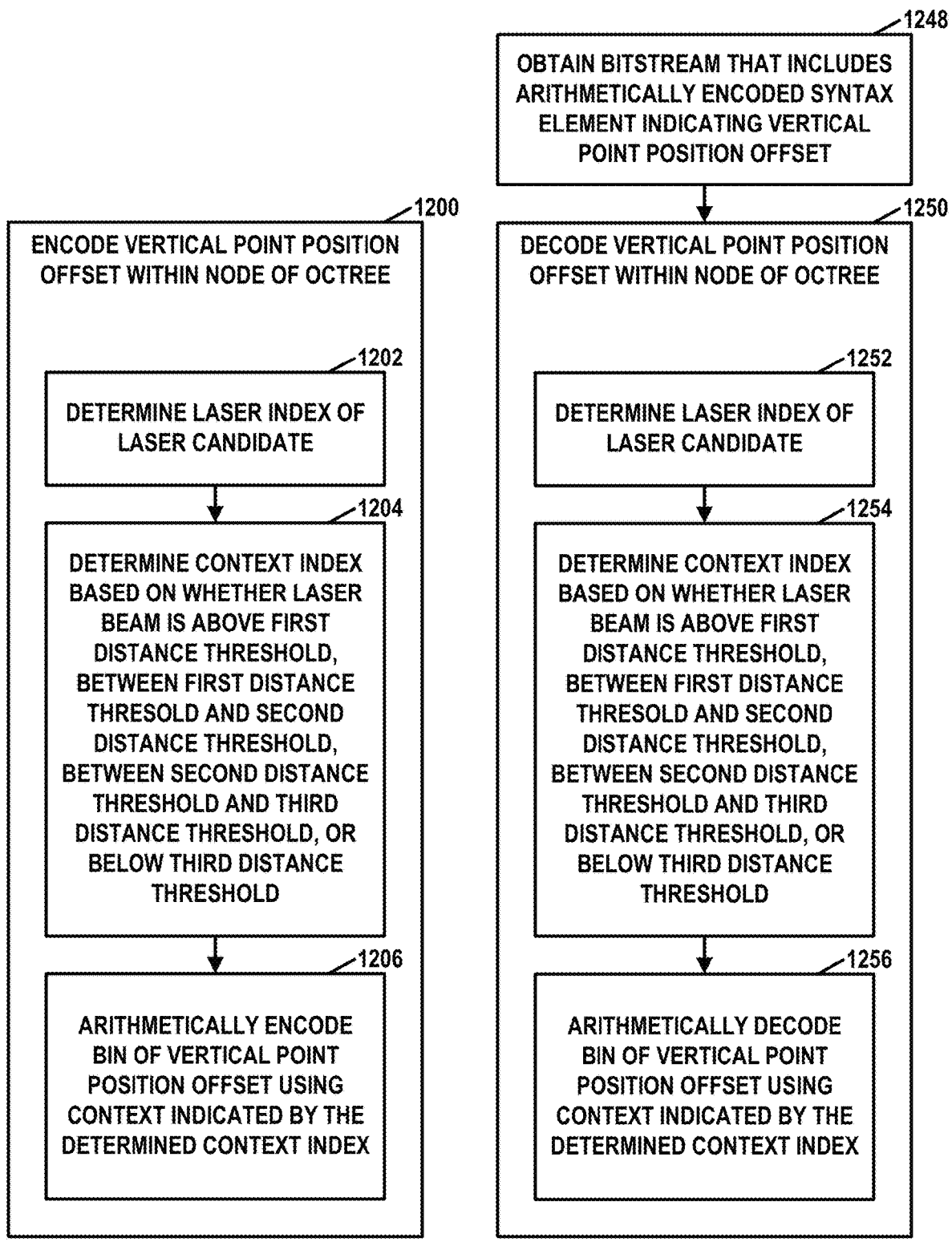
FIG. 12A is a flowchart illustrating an example operation for encoding an IDCM vertical point offset in accordance with one or more techniques of this disclosure.
FIG. 12B is a flowchart illustrating an example operation for decoding an IDCM vertical point offset in accordance with one or more techniques of this disclosure.

FIG. 12A is a flowchart illustrating an example operation for encoding an IDCM vertical point offset in accordance with one or more techniques of this disclosure. In the example of FIG. 12A, G-PCC encoder 200 (e.g., arithmetic encoding unit 214 of G-PCC encoder 200 (FIG. 2)) may encode a vertical point position offset within a node of a tree (e.g., an octree) that represents 3-dimensional positions of points in a point cloud represented by point cloud data (1200). As part of encoding the vertical point position offset, the G-PCC encoder 200 may determine a laser index of a laser candidate in a set of laser candidates (1202). The determined laser index indicates a laser beam that intersects the node. G-PCC encoder 200 may determine the laser index in accordance with any of the examples provided elsewhere in this disclosure. For instance, G-PCC encoder 200 may determine the laser index as indicated in Table 2, above.

Additionally, G-PCC encoder 200 (e.g., arithmetic encoding unit 214) may determine a context index (idcmIdxAngular) based on whether the laser beam is above a first distance threshold (corresponding to line 1104A), between the first distance threshold and a second distance threshold (corresponding to line 1104B), between the second distance threshold and a third distance threshold (corresponding to line 1104C), or below the third distance threshold (1204). For instance, in the example of FIG. 11, G-PCC encoder 200 may determine a laser difference angle (e.g., thetaLaserDeltaVirtualInterval) for an interval corresponding to the bin by subtracting a tangent of the angle of the line passing through the midpoint of the node (ThetaLaser) from a tangent of an angle of the interval (theta32). The angle of the interval may correspond to an angle, from an origin point of a set of lasers, of the interval. G-PCC encoder 200 may determine a top angle difference (e.g., DeltaTop) by subtracting a shift value from the laser difference angle for the interval. G-PCC encoder 200 may determine a bottom angle difference (e.g., DeltaBottom) by adding the shift value to the laser difference angle for the interval.

G-PCC encoder 200 may perform a first comparison (e.g., thetaLaserDeltaVirtualInterval>=0) that determines whether the laser difference angle for the interval is greater than or equal to 0. G-PCC encoder 200 may set the context index to 0 or 1 based on whether the laser difference angle for the interval is greater than or equal to 0 (e.g., idcmIdxAngular[i][j]=thetaLaserDeltaVirtualInterval>=0?0:1). G-PCC encoder 200 may perform a second comparison (DeltaTop>=0) that determines whether the top angle difference is greater than or equal to 0. The laser beam may be above the first distance threshold when the top angle difference is greater than or equal to 0. G-PCC encoder 200 may perform a third comparison (e.g., DeltaBottom<0) that determines whether the bottom angle difference is less than 0. The laser beam may be below the third distance threshold when the bottom angle difference is less than 0. G-PCC encoder 200 may increment the context index by 2 based on the top angle difference being greater than or equal to 0 (e.g., if (DeltaTop>=0) idcmIdxAngular[i][j]+=2) or based on the bottom angle difference being less than 0 (e.g., Else if (DeltaBottom<0) idcmIdxAngular[i][j]+=2).

G-PCC encoder 200 (e.g., arithmetic encoding unit 214 of G-PCC encoder 200) may arithmetically encode bins of the vertical point position offset using a context indicated by the determined context index (1206). For example, G-PCC encoder 200 may perform CABAC encoding on bins of a syntax element indicating the vertical point position offset.

FIG. 12B is a flowchart illustrating an example operation for decoding an IDCM vertical point offset in accordance with one or more techniques of this disclosure. In the example of FIG. 12B, G-PCC decoder 300 may obtain a bitstream (e.g., a geometry bitstream or other type of bitstream) that includes an arithmetically encoded syntax element indicating a vertical point position within a node of a tree (e.g., an octree) that represents 3-dimensional positions of points in a point cloud represented by point cloud data (1248). For instance, G-PCC decoder 300 may obtain the bitstream from a wired-based or wireless communication channel. In some examples, G-PCC decoder 300 may obtain the bitstream from a transitory or non-transitory computer-readable storage medium. A processing unit, network interface, memory controller, or other type of hardware may obtain the bitstream.

G-PCC decoder 300 may decode a vertical point position offset within a node of a tree (e.g., an octree) that represents 3-dimensional positions of points in the point cloud (1250).

As part of decoding the vertical point position offset, G-PCC decoder 300 may determine a laser index of a laser candidate in a set of laser candidates (1252). The determined laser index indicates a laser beam that intersects the node. G-PCC decoder 300 may determine the laser index in accordance with any of the examples provided elsewhere in this disclosure. For instance, G-PCC decoder 300 may determine the laser index as indicated in Table 2, above.

Additionally, G-PCC decoder 300 (e.g., geometry arithmetic decoding unit 302 of G-PCC decoder 300 (FIG. 3)) may determine a context index (idcmIdxAngular) based on whether the laser beam is above a first distance threshold, between the first distance threshold and a second distance threshold, between the second distance threshold and a third distance threshold, or below the third distance threshold (1254). G-PCC decoder 300 may determine the context index in the same manner as G-PCC encoder 200, as described above.

G-PCC decoder 300 (e.g., geometry arithmetic decoding unit 302 of G-PCC decoder 300) may arithmetically decode bins of the vertical point position offset using a context indicated by the determined context index (1256). For example, G-PCC decoder 300 may perform CABAC decoding on bins of a syntax element indicating the vertical point position offset. G-PCC decoder 300 may perform the operation of FIG. 12B as part of reconstructing a point cloud. As part of reconstructing one or more points of the point cloud, G-PCC decoder 300 may determine positions of one or more points of the point cloud based on the vertical point position offset. For instance, G-PCC decoder 300 may determine a vertical position of a point in the reconstructed point cloud as the vertical point position offset plus the vertical position of an origin point of the node.

As mentioned above, a number_lasers syntax element may be signaled in a parameter set, such as the geometry parameter set. The number_lasers syntax element indicates the number of lasers used for the angular coding mode. However, in accordance with one or more techniques of this disclosure, the number of lasers used for the angular coding mode may be signaled (e.g., in a parameter set such as a geometry parameter set or other syntax header) as number_lasers minusL so that the number of lasers is obtained by adding value L to the signaled number_lasers minusL value. Thus, in some examples, a G-PCC coder (e.g., G-PCC encoder 200 or G-PCC decoder 300) may code a syntax element having a first value, wherein the first value plus a second value indicates a number of lasers, wherein the second value is a minimum number of lasers.

In some examples, the value L is equal to 1, because there should be at least one laser for the angular mode to be useful in coding, for example, the planar mode's plane positions or IDCM's point position offsets. The number_lasers minus1 syntax element may be coded in the bitstream using variable length codes, such as k-th order exponential Golomb codes, or fixed length codes. In some examples, the value L may be equal to a minimum number of lasers required for the angular mode to be useful in coding. In some examples, the number_lasers minusL syntax element may be coded in the bitstream using variable length codes, such as k-th order exponential Golomb codes, or fixed length codes.

The geometry parameter set syntax table is modified as in Table 11 below, with modified text indicated with <!> . . . </!> tags. More specifically, Table 11 shows signaling of number of lasers minus1 in the geometry parameter set. In Table 11, <#> . . . </#> tags denote syntax elements related to the angular mode.

TABLE 11

| | Descriptor |
|---|---|
| geometry_parameter_set( ) { | |
| ... | ... |
|     geometry_planar_mode_flag | u(1) |
|     if( geometry_planar_mode flag ){ | |
|         geom_planar_mode_th_idcm | ue(v) |
|         geom_planar_mode_th[ 1 ] | ue(v) |
|         geom_planar_mode_th[ 2 ] | ue(v) |
|     } | |
| <#>    geometry_angular_mode_flag</#> | u(1) |
| <#>    if( geometry_angular_mode_flag ){ </#> | |
| <#>        lidar_head_position[0] </#> | se(v) |
| <#>        lidar_head_position[1] </#> | se(v) |
| <#>        lidar_head_position[2] </#> | se(v) |
| <!>        number_lasers_minus1</!> | ue(v) |
| <#>        for( i = 0; i < (number_lasers_minus1 + 1); i++ ) {</#> | |
| <#>            laser_angle[ i ] </#> | se(v) |
| <#>            laser_correction[ i ] </#> | se(v) |
| <#>        }</#> | |
| <#>    planar_buffer_disabled</#> | u(1) |
| <#> | se(v) |
|     implicit_qtbt_angular_max_node_min_dim_log2_to_split_z< /#> | |
| <#>        implicit_qtbt_angular_max_diff_to_split_z</#> | se(v) |
| <#>  } </#> | |
|     neighbour_context_restriction_flag | u(1) |
|     inferred_direct_coding_mode_enabled_flag | u(1) |
| ... | |

The semantics of the number_lasers_minus1 syntax element is given by: number_lasers_minus1 value plus 1 specifies the number of lasers used for the angular coding mode. When not present, number_lasers_minus1 is inferred to −1.

Figure 13:
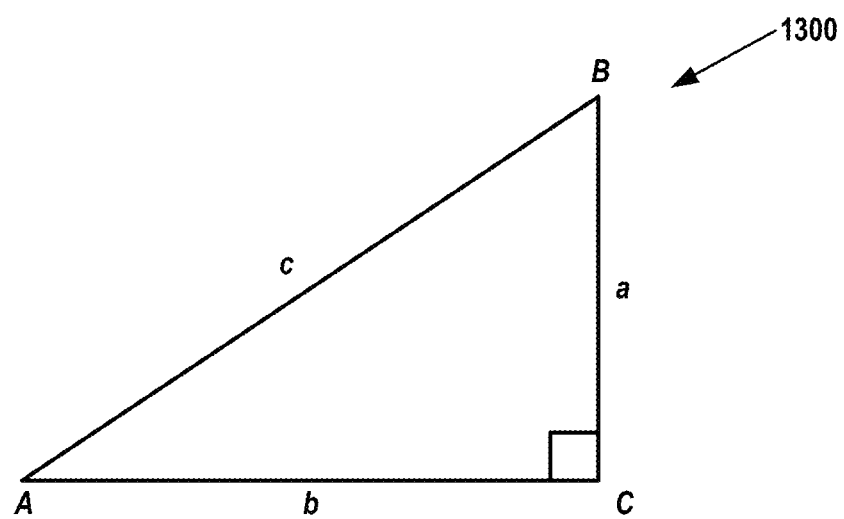
FIG. 13 is a conceptual diagram indicating corners and sides of a right triangle.

In some examples of this disclosure, angular mode may be simplified by omitting inverse square root of Euclidian distance computation. The principle for omitting the inverse square root of the Euclidian distance computation is based on the equation to compute the tangent of an angle as follows (trigonometry), as shown in FIG. 13. FIG. 13 is a conceptual diagram indicating corners and sides of a right triangle 1300. As shown in FIG. 13, tangent (angle of corner A)=a/b=opposite side/adjacent side.

The more general case in three dimensions: if corner A has coordinates (X0, Y0, Z0) and corner B has coordinates (X, Y, Z), then the tangent is given by:

$$\tan A = (Z-Z0)/\sqrt{(X-X0)^2 + (Y-Y0)^2}$$

The inverse square root can be eliminated by squaring both sides of the equation:

$$(\tan A)^2[(X-X0)^2 + (Y-Y0)^2] = (Z-Z0)^2 \quad \text{(Eq. 1)}$$

In this disclosure, based on the principle above, the G-PCC coder may determine the index of the laser that intersects the current node, if it is eligible, and/or determine the context index for coding of the planar mode's vertical plane position using angular mode. Let Z_marker be the vertical coordinate of the marker point with respect to the origin and let Tan_laser be the tangent of the angle between the candidate laser beam's direction and the horizontal plane through the origin. Both values may be positive or negative: Z_marker_sign and Tan_laser_sign (assuming values+1 or −1). The G-PCC coder may determining the intersecting laser index by computing the square of Z_marker (Z2_marker) and the square of Tan_laser multiplied with the square of the Euclidian distance (Eq. 1) which determines the square of the laser's vertical coordinate (Z2 laser). The smallest (absolute value) delta value between the two quantities Z_marker_sign*Z2_marker and Tan_laser_sign*Z2 laser determines the index of the laser that intersects the node. Optionally, an approximate laser correction offset Z_correction_sign*Z2 _correction may be included in the delta computation. The G-PCC coder may determine the context index by checking the sign of the smallest delta value above (before absolute value). A positive delta value maps to one context index and a negative delta value maps to the second context index. Alternatively, the delta value may be compared with subintervals (see more details in inventions above) to determine the context index, for example, in the case of three contexts. The G-PCC coder may determine the index of the laser that intersects the current node, if the current node is eligible, and/or determine the context index for coding of IDCM vertical point position offsets using angular mode. This determination is similar in nature as the previous one (see also previous invention).

The above principles, which employ sensor information, are not limited to coding the planar mode's vertical (Z) plane position syntax element within a node, but similar principles may also be applied to coding the planar mode's X or Y plane position syntax elements within a node.

The planar mode's X or Y plane position modes may be chosen by G-PCC encoder 200 if they are more appropriate to code the point distribution within the node. It is also understood that the above principles, which employ sensor information, are not limited to coding the IDCM's vertical (Z) point position offset within a node, but that similar principles may also be applied to coding the X or Y point position offsets within a node.

Building upon the text of w19088 for determining the laser index of a laser that intersects the current node as specified above, the specification text changes of this example are provided in Table 12, below. More specifically, Table 12 below shows example specification text determining a laser index through the current node without inverse square root of distance computations.

TABLE 12

...
Otherwise, if the angular eligibility angular_eligible[Child] is equal to 1, the following applies as a continuation of the process described in section 8.2.5.1 [1],
    midNodeX = (1 << (ChildNodeSizeXLog2) >> 1)
    midNodeY = (1 << (ChildNodeSizeXLog2) >> 1)
    midNodeZ = (1 << (ChildNodeSizeZLog2) >> 1)
    xLidar = xNchild − lidar_head_position[0] + midNodeX
    yLidar = yNchild − lidar_head_position[1] + midNodeY
    zLidar = zNchild − lidar_head_position[2] + midNodeZ
where (xNchild, yNchild, zNchild) specifies the position of the geometry octree child node Child in the current slice.
The squared and scaled Euclidian distance is given by:
    r2 = (xLidar*xLidar + yLidar*yLidar) >> 3
    (note: right-shift scaling >>N may be required to reduce bitdepth of result)
The square of the vertical coordinate to the midNode is given by:
    z2 = zLidar * zLidar
The angular eligibility and the associated laser to the child node are determined as follows, based on the parent node Parent of the child node:
laserIndex [Child] = UNKNOWN_LASER
idcm4angular[Child] = 0
if (laserIndex [Parent] == UNKNOWN_LASER || deltaAngleR <= (midNodeZ<< (26 + 2)))

TABLE 12-continued signForCtx = deltaSign
        }
    }
} else idcm4angular[Child] = 1
...

The G-PCC coder may determine the context index (contextAngular) of the laser crossing the node above or below the node mid-point as follows in Table 13.

TABLE 13

...
The angular context is deduced from the sign of signForCtx.
contextAngular[Child] = 0
if (signForCtx < 0) contextAngular[Child] = 1
...

Signaling of Laser Angle and Laser Offset

For every laser, the corresponding laser angle, and laser offset (laser position relative to the head position) are signaled (e.g., as indicated with text enclosed in <!> . . . </!> tags), as indicated in Table 14 below.

TABLE 14

| | Descriptor |
|---|---|
| geometry_parameter_set( ) { | |
| ... | ... |
|   geometry_planar_mode_flag | u(1) |
|   if( geometry_planar_mode_flag ){ | |
|     geom_planar_mode_th_idcm | ue(v) |
|     geom_planar_mode_th[ 1 ] | ue(v) |
|     geom_planar_mode_th[ 2 ] | ue(v) |
|   } | |
|   geometry_angular_mode_flag | u(1) |
|   if( geometry_angular_mode_flag ){ | |
|     lidar_head_position[0] | se(v) |
|     lidar_head_position[1] | se(v) |
|     lidar_head_position[2] | se(v) |
|     number_lasers | ue(v) |
| <!>    for( i = 0; i < number_lasers; i++ ) {</!> | |
| <!>      laser_angle[ i ]</!> | se(v) |
| <!>      laser_correction[ i ]</!> | se(v) |
| <!>    }</!> | |
|     planar_buffer_disabled | u(1) |
|     implicit_qtbt_angular_max_node_min_dim_log2_to_split_z | se(v) |
|     implicit_qtbt_angular_max_diff_to_split_z | se(v) |
|   } | |
|   neighbour_context_restriction_flag | u(1) |
|   inferred_direct_coding_mode_enabled_flag | u(1) |
| ... | |

TABLE 12-continued

{
  minDelta = 1 << (18 + 7) (note: minimum is determined below, so this set to maximum)
  for (j = 0; j < number_lasers; j++) {
    laser_angle2 = (((laser_angle[j] * laser_angle[j]) >> 3) * r2) >> 30)
    (note: laser_angle array contains tangents of angles; scaling to reduce result bitdepth)
    laser_correction2 = laser_correction[j] * laser_correction [j]
    delta = (+/− laser_angle2 +/− laser_correction2 +/− z2)
    (note: +/− depending on signs of laser_angle[j], laser_correction[j], zLidar before squaring to obtain delta value; including laser_correction2 is optional and approximate)
    deltaAbs = abs(delta)
    deltaSign = sign(delta)
    if (deltaAbs < minDelta) {
      minDelta = deltaAbs
      laserIndex [Child] = j Thus, in some examples, a device (e.g., G-PCC encoder 200 or G-PCC decoder 300) may signal, for each laser of the set of laser candidates, a corresponding laser angle and a corresponding laser offset.

Although in the syntax description above, it is described that laser angle and laser correction are both coded with se(v) (i.e., signed integer 0-th order Exp-Golomb coding with left bit first), the software description is different compared to the syntax description. In general, laser angle and laser corrections are represented in floating point format in the encoder input configuration, and the values are scaled to an integer and an offset is added to convert the integer to a positive integer. The positive integer may be signaled, e.g., as part of the bitstream, as follows:

```
for (auto val : params.encoder.lasersTheta) {
        int one = 1 << 18;
params.encoder.gps.geom_angular_theta_laser.push_back(round(val
* one));
    }
        for (auto val : params.encoder.lasersZ) {
            int one = 1 << 3;
            params.encoder.gps.geom_angular_z_laser.push_back(
                round(val *
params.encoder.sps.seq_source_geom_scale_factor * one));
    }
for (int i = 0; i < gps.geom_angular_num_lidar_lasers( ); i++) {
        bs.writeUe(gps.geom_angular_theta_laser[i] + 1048576);
        bs.writeUe(gps.geom_angular_z_laser[i] + 1048576);
    }
```

The laser angles may be arranged in a sorted format, e.g., the angles are monotonically increasing or decreasing with the array index. If not arranged in this format, a preprocessing of the input can be possible to sort the angles prior to coding. It is observed that the laser angles are very similar to each other. In this scenario, the angles of array index i can be predicted from angle of index i−1, and only the difference can be signaled, i.e., delta coding can be applied.

It is observed that the angle of a particular laser is very similar to its neighbor laser(s). In this scenario, the angle of the i-th laser can be predicted from an angle of the (i-1)-th laser, and only the difference can be signaled, i.e., delta coding can be applied with se(v) coding.

The similar delta coding can also be applied for the laser correction, as shown in Table 15, below.

TABLE 15

|  |  | Descriptor |
|---|---|---|
| geometry_parameter_set( ) { |  |  |
| ... |  | ... |
| geometry_planar_mode_flag |  | u(1) |
| if( geometry_planar_mode_flag ){ |  |  |
| geom_planar_mode_th_idcm |  | ue(v) |
| geom_planar_mode_th[ 1 ] |  | ue(v) |
| geom_planar_mode_th[ 2 ] |  | ue(v) |
| } |  |  |
| geometry_angular_mode_flag |  | u(1) |
| if( geometry_angular_mode_flag ){ |  |  |
| lidar_head_position[0] |  | se(v) |
| lidar_head_position[1] |  | se(v) |
| lidar_head_position[2] |  | se(v) |
| number_lasers |  | ue(v) |
| <!> for( i = 0; i < number_lasers; i++ ) {</!> |  |  |
| <!> laser_angle_delta[ i ]</!> |  | se(v) |
| <!> laser_correction_delta[ i ]</!> |  | se(v) |
| <!> }</!> |  |  |
| planar_buffer_disabled |  | u(1) |
| implicit_qtbt_angular_max_node_min_dim_log2_to_split_z |  | se(v) |
| implicit_qtbt_angular_max_diff_to_split_z |  | se(v) |
| } |  |  |
| neighbour_context_restriction_flag |  | u(1) |
| inferred_direct_coding_mode_enabled_flag |  | u(1) |
| ... |  |  |

The laser_angle[i] and laser_correction[i] can be derived respectively from laser_angle_delta[i] and laser_correction_delta[i], at G-PCC decoder 300, as follows:

```
pred_angle = 0 ;
pred_correction = 0 ;
For(i=0;i<number_lasers;i++){
    If (i>0){
        pred_angle = laser_angle[i −1];
        pred_correction = laser_correction[i −1];
    }
    laser_angle[i] = laser_angle_delta[i] + pred_angle ;
    laser_correction[i] = laser_correction_delta[i] + pred_correction ;
}
```

In some examples, laser angle delta[i] (except for laser_angle_delta[0]) can be coded as an unsigned integer if the laser angles are sorted (monotonically increasing and decreasing), as the deltas would be either all positive or all negative.

So, for laser_angle_delta [0], se(v) coding (i.e., signed integer 0-th order Exp-Golomb coding with left bit first) is used, and for other laser_angle_delta[i] (i>0), ue(v) coding is used. laser_offset_deltas are coded with se(v), e.g., as shown in Table 16 below.

TABLE 16

| | Descriptor |
|---|---|
| geometry_parameter_set( ) { | |
| ... | ... |
| geometry_planar_mode_flag | u(1) |
| if( geometry_planar_mode_flag ){ | |
| geom_planar_mode_th_idcm | u(v) |
| geom_planar_mode_th[ 1 ] | ue(v) |
| geom_planar_mode_th[ 2] | ue(v) |
| } | |
| geometry_angular_mode_flag | u(1) |
| if( geometry_angular_mode_flag ){ | |
| lidar_head_position[0] | se(v) |
| lidar_head_position[1] | se(v) |
| lidar_head_position[2] | se(v) |
| number_lasers | ue(v) |
| <!>for(i=0; i <number_lasers; i++ ) {</!> | |
| <!> if(i==0) </!> | |
| <!>   laser_angle_delta[ i ]</!> | se(v) |
| <!> else</!> | |
| <!>   laser_angle_delta[ i ]</!> | ue(v) |
| <!> laser_correction_delta[ i ]</!> | se(v) |
| <!>}</!> | |
| planar_buffer_disabled | u(1) |
| implicit_qtbt_angular_max_node_min_dim_log2_to_split_z | se(v) |
| implicit_qtbt_angular_max_diff_to_split_z | se(v) |
| } | |
| neighbour_context_restriction_flag | u(1) |
| inferred_direct_coding_mode_enabled_flag | u(1) |
| ... | |

In another example, laser_angle_delta[i] and laser_correction_delta[i] can be coded with Exp-Golomb code with order k. k can be self-adaptive (based on the magnitude of delta values), fixed and encoder configurable, or fixed and predetermined. In another example, delta coding may only be applicable to laser angles but not laser corrections.

Figure 14:
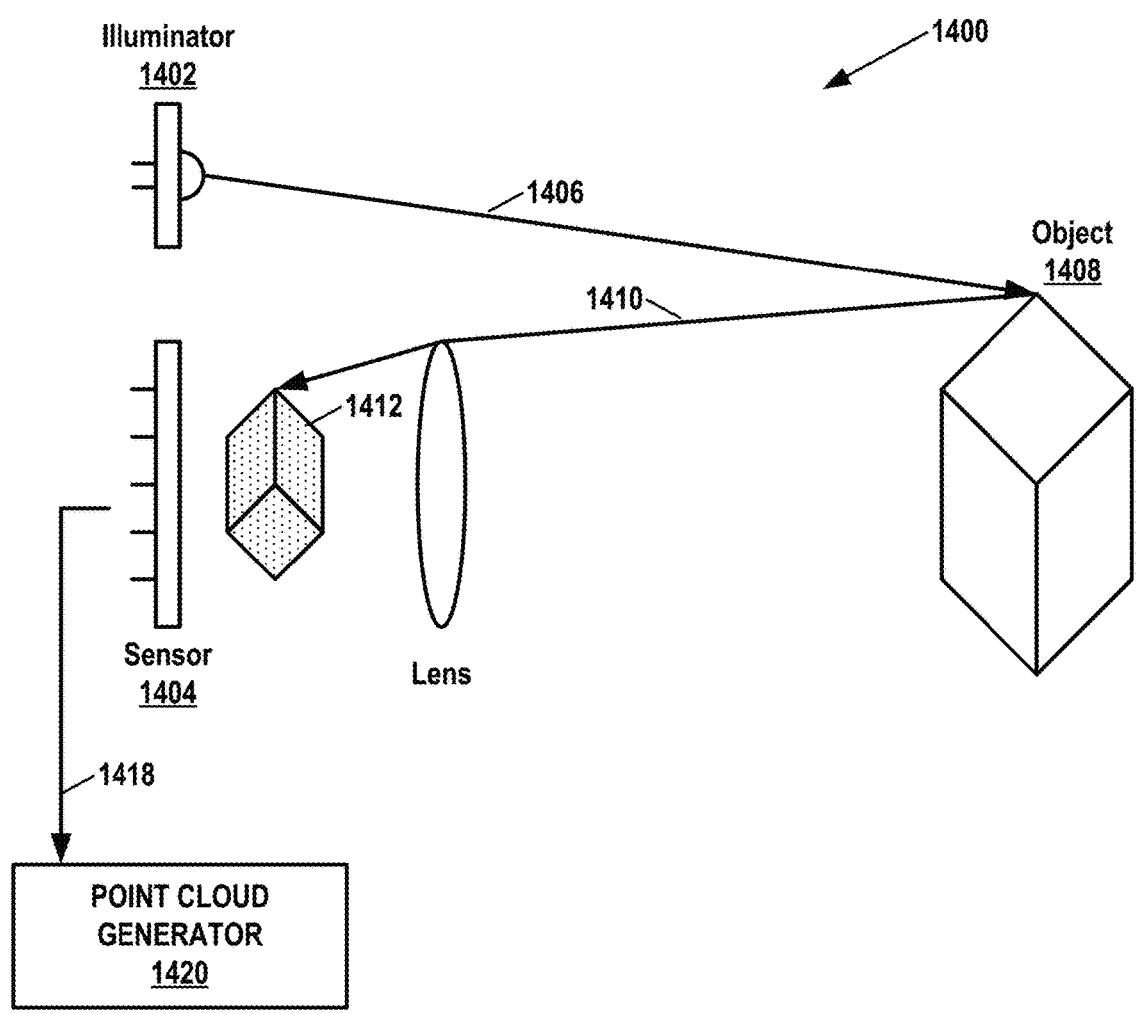
FIG. 14 is a conceptual diagram illustrating an example range-finding system that may be used with one or more techniques of this disclosure.

FIG. 14 is a conceptual diagram illustrating an example range-finding system 1400 that may be used with one or more techniques of this disclosure. In the example of FIG. 14, range-finding system 1400 includes an illuminator 1402 and a sensor 1404. Illuminator 1402 may emit light 1406. In some examples, illuminator 1402 may emit light 1406 as one or more laser beams. Light 1406 may be in one or more wavelengths, such as an infrared wavelength or a visible light wavelength. In other examples, light 1406 is not coherent, laser light. When light 1406 encounters an object, such as object 1408, light 1406 creates returning light 1410. Returning light 1410 may include backscattered and/or reflected light. Returning light 1410 may pass through a lens 1411 that directs returning light 1410 to create an image 1412 of object 1408 on sensor 1404. Sensor 1404 generates signals 1414 based on image 1412. Image 1412 may comprise a set of points (e.g., as represented by dots in image 1412 of FIG. 14).

In some examples, illuminator 1402 and sensor 1404 may be mounted on a spinning structure so that illuminator 1402 and sensor 1404 capture a 360-degree view of an environment. In other examples, range-finding system 1400 may include one or more optical components (e.g., mirrors, collimators, diffraction gratings, etc.) that enable illuminator 1402 and sensor 1404 to detect ranges of objects within a specific range (e.g., up to 360-degrees). Although the example of FIG. 14 only shows a single illuminator 1402 and sensor 1404, range-finding system 1400 may include multiple sets of illuminators and sensors.

In some examples, illuminator 1402 generates a structured light pattern. In such examples, range-finding system 1400 may include multiple sensors 1404 upon which respective images of the structured light pattern are formed. Range-finding system 1400 may use disparities between the images of the structured light pattern to determine a distance to an object 1408 from which the structured light pattern backscatters. Structured light-based range-finding systems may have a high level of accuracy (e.g., accuracy in the sub-millimeter range), when object 1408 is relatively close to sensor 1404 (e.g., 0.2 meters to 2 meters). This high level of accuracy may be useful in facial recognition applications, such as unlocking mobile devices (e.g., mobile phones, tablet computers, etc.) and for security applications.

In some examples, range-finding system 1400 is a time of flight (ToF)-based system. In some examples where range-finding system 1400 is a ToF-based system, illuminator 1402 generates pulses of light. In other words, illuminator 1402 may modulate the amplitude of emitted light 1406. In such examples, sensor 1404 detects returning light 1410 from the pulses of light 1406 generated by illuminator 1402. Range-finding system 1400 may then determine a distance to object 1408 from which light 1406 backscatters based on a delay between when light 1406 was emitted and detected and the known speed of light in air). In some examples, rather than (or in addition to) modulating the amplitude of the emitted light 1404, illuminator 1402 may modulate the phase of the emitted light 1404. In such examples, sensor 1404 may detect the phase of returning light 1410 from object 1408 and determine distances to points on object 1408 using the speed of light and based on time differences between when illuminator 1402 generated light 1406 at a specific phase and when sensor 1404 detected returning light 1410 at the specific phase.

In other examples, a point cloud may be generated without using illuminator 1402. For instance, in some examples, sensors 1404 of range-finding system 1400 may include two or more optical cameras. In such examples, range-finding system 1400 may use the optical cameras to capture stereo images of the environment, including object 1408. Range-finding system 1400 may include a point cloud generator 1420 that may calculate the disparities between locations in the stereo images. Range-finding system 1400 may then use the disparities to determine distances to the locations shown in the stereo images. From these distances, point cloud generator 1420 may generate a point cloud.

Sensors 1404 may also detect other attributes of object 1408, such as color and reflectance information. In the example of FIG. 14, a point cloud generator 1416 may generate a point cloud based on signals 1418 generated by sensor 1404. Range-finding system 1400 and/or point cloud generator 1416 may form part of data source 104 (FIG. 1). Hence, a point cloud generated by range-finding system 1400 may be encoded and/or decoded according to any of the techniques of this disclosure.

Figure 15:
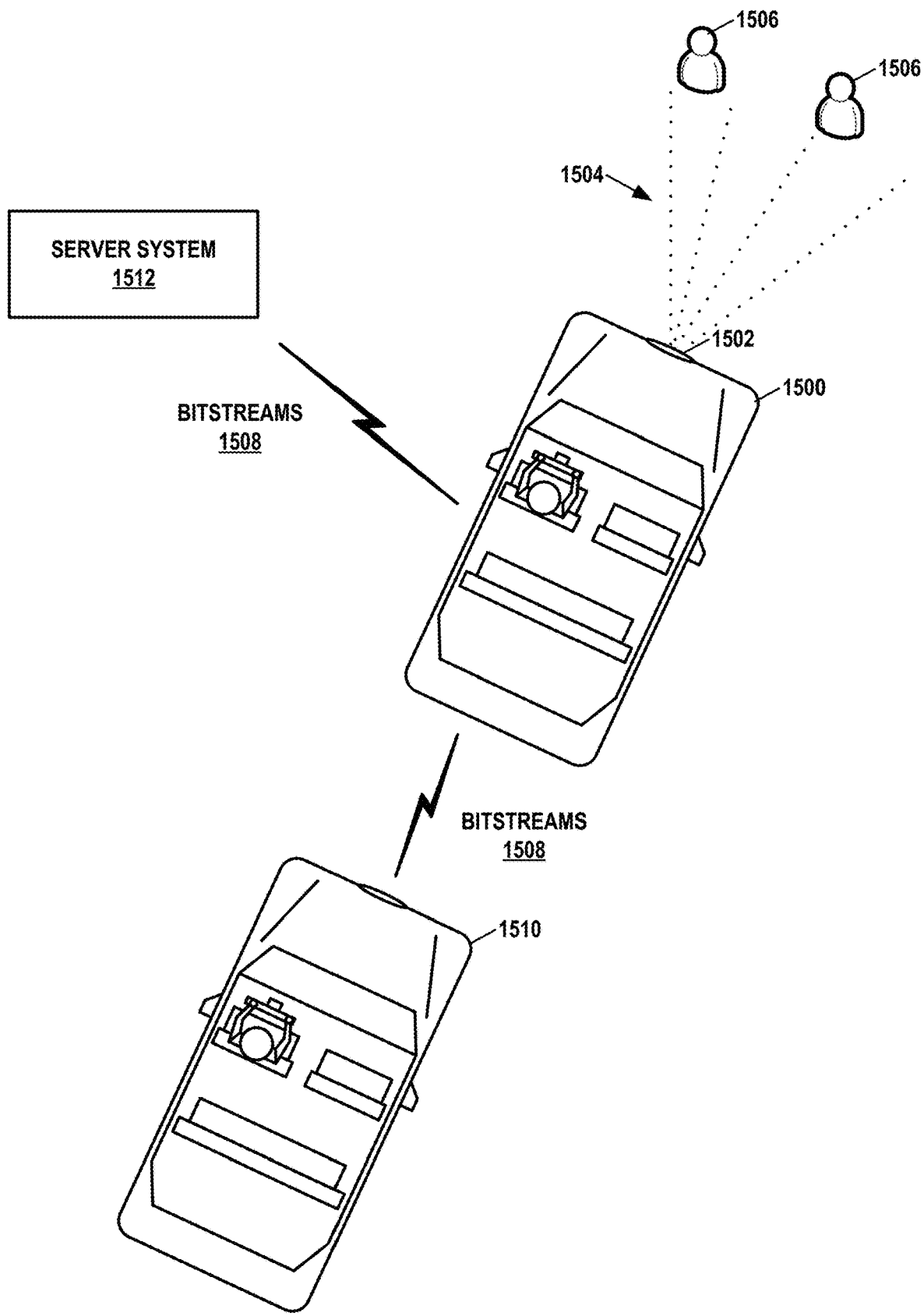
FIG. 15 is a conceptual diagram illustrating an example vehicle-based scenario in which one or more techniques of this disclosure may be used.

FIG. 15 is a conceptual diagram illustrating an example vehicle-based scenario in which one or more techniques of this disclosure may be used. In the example of FIG. 15, a vehicle 1500 includes a range-finding system 1502. Range-finding system 1502 may be implemented in the manner discussed with respect to FIG. 14. Although not shown in the example of FIG. 15, vehicle 1500 may also include a data source, such as data source 104 (FIG. 1), and a G-PCC encoder, such as G-PCC encoder 200 (FIG. 1). In the example of FIG. 15, range-finding system 1502 emits laser beams 1504 that reflect off pedestrians 1506 or other objects in a roadway. The data source of vehicle 1500 may generate a point cloud based on signals generated by range-finding system 1502. The G-PCC encoder of vehicle 1500 may encode the point cloud to generate bitstreams 1508, such as geometry bitstream 203 (FIG. 2) and attribute bitstream 205 (FIG. 2). Bitstreams 1508 may include many fewer bits than the unencoded point cloud obtained by the G-PCC encoder.

An output interface of vehicle 1500 (e.g., output interface 108 (FIG. 1) may transmit bitstreams 1508 to one or more other devices. Bitstreams 1508 may include many fewer bits than the unencoded point cloud obtained by the G-PCC encoder. Thus, vehicle 1500 may be able to transmit bitstreams 1508 to other devices more quickly than the unencoded point cloud data. Additionally, bitstreams 1508 may require less data storage capacity. The techniques of this disclosure may further reduce the number of bits in bitstreams 1508. For instance, determining a context index based on an intersection of a laser beam and a node, and using a context indicated by the context index for arithmetic coding of a vertical plane position or a vertical point position offset, may further reduce the number of bits in bitstreams 1508.

In the example of FIG. 15, vehicle 1500 may transmit bitstreams 1508 to another vehicle 1510. Vehicle 1510 may include a G-PCC decoder, such as G-PCC decoder 300 (FIG. 1). The G-PCC decoder of vehicle 1510 may decode bitstreams 1508 to reconstruct the point cloud. Vehicle 1510 may use the reconstructed point cloud for various purposes. For instance, vehicle 1510 may determine based on the reconstructed point cloud that pedestrians 1506 are in the roadway ahead of vehicle 1500 and therefore start slowing down, e.g., even before a driver of vehicle 1510 realizes that pedestrians 1506 are in the roadway. Thus, in some examples, vehicle 1510 may perform an autonomous navigation operation based on the reconstructed point cloud.

Additionally or alternatively, vehicle 1500 may transmit bitstreams 1508 to a server system 1512. Server system 1512 may use bitstreams 1508 for various purposes. For example, server system 1512 may store bitstreams 1508 for subsequent reconstruction of the point clouds. In this example, server system 1512 may use the point clouds along with other data (e.g., vehicle telemetry data generated by vehicle 1500) to train an autonomous driving system. In other example, server system 1512 may store bitstreams 1508 for subsequent reconstruction for forensic crash investigations (e.g., if vehicle 1500 collides with pedestrians 1506).

Figure 16:
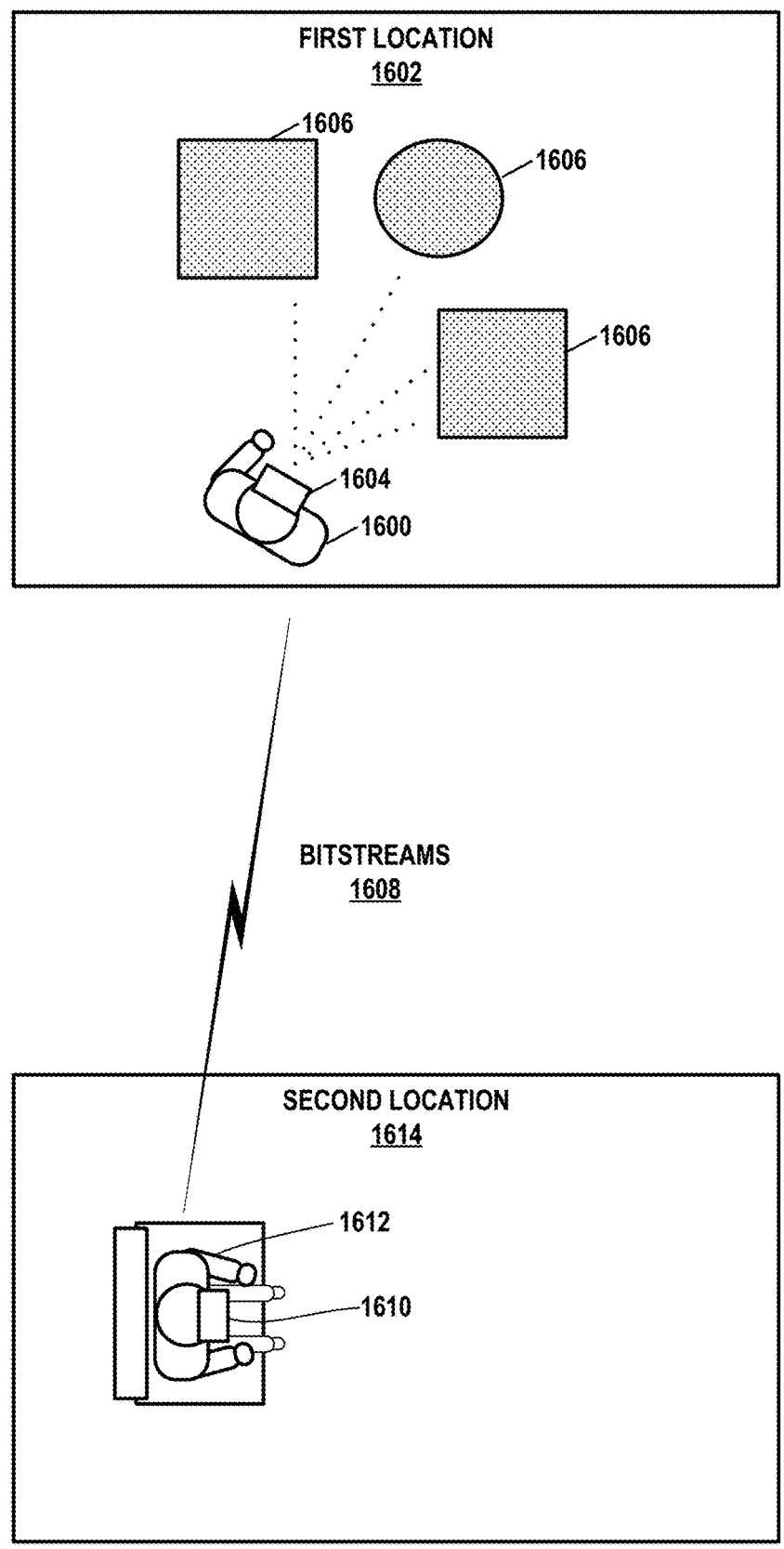
FIG. 16 is a conceptual diagram illustrating an example extended reality system in which one or more techniques of this disclosure may be used.

FIG. 16 is a conceptual diagram illustrating an example extended reality system in which one or more techniques of this disclosure may be used. Extended reality (XR) is a term used to cover a range of technologies that includes augmented reality (AR), mixed reality (MR), and virtual reality (VR). In the example of FIG. 16, a user 1600 is located in a first location 1602. User 1600 wears an XR headset 1604. As an alternative to XR headset 1604, user 1600 may use a mobile device (e.g., mobile phone, tablet computer, etc.). XR headset 1604 includes a depth detection sensor, such as a range-finding system, that detects positions of points on objects 1606 at location 1602. A data source of XR headset 1604 may use the signals generated by the depth detection sensor to generate a point cloud representation of objects 1606 at location 1602. XR headset 1604 may include a G-PCC encoder (e.g., G-PCC encoder 200 of FIG. 1) that is configured to encode the point cloud to generate bitstreams 1608.

XR headset 1604 may transmit bitstreams 1608 (e.g., via a network such as the Internet) to an XR headset 1610 worn by a user 1612 at a second location 1614. XR headset 1610 may decode bitstreams 1608 to reconstruct the point cloud. XR headset 1610 may use the point cloud to generate an XR visualization (e.g., an AR, MR, VR visualization) representing objects 1606 at location 1602. Thus, in some examples, such as when XR headset 1610 generates an VR visualization, user 1612 may have a 3D immersive experience of location 1602. In some examples, XR headset 1610 may determine a position of a virtual object based on the reconstructed point cloud. For instance, XR headset 1610 may determine, based on the reconstructed point cloud, that an environment (e.g., location 1602) includes a flat surface and then determine that a virtual object (e.g., a cartoon character) is to be positioned on the flat surface. XR headset 1610 may generate an XR visualization in which the virtual object is at the determined position. For instance, XR headset 1610 may show the cartoon character sitting on the flat surface.

The techniques of this disclosure may further reduce the number of bits in bitstreams 1608. For instance, determining a context index based on an intersection of a laser beam and a node, and using a context indicated by the context index for arithmetic coding of a vertical plane position or a vertical point position offset, may further reduce the number of bits in bitstreams 1608.

Figure 17:
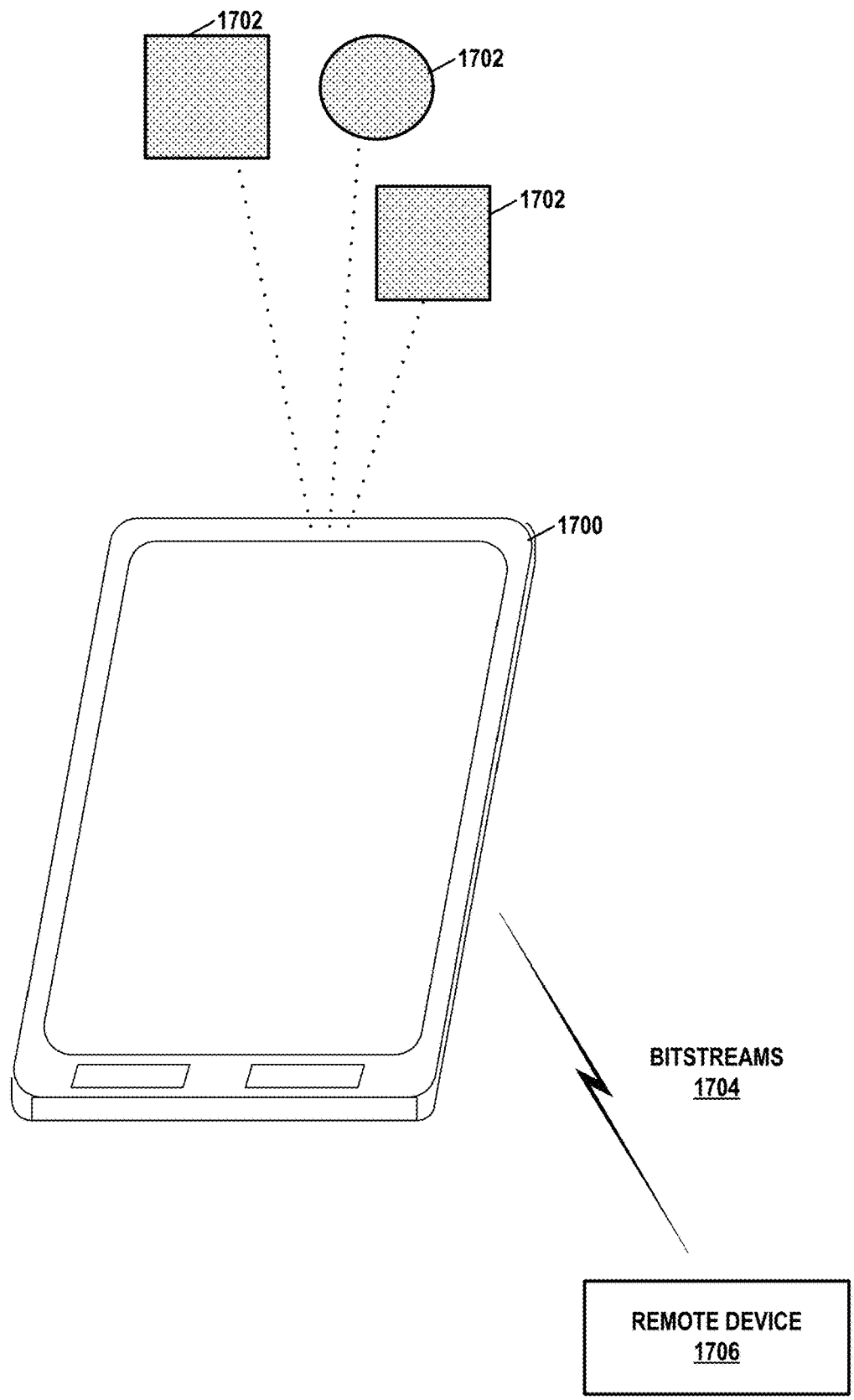
FIG. 17 is a conceptual diagram illustrating an example mobile device system in which one or more techniques of this disclosure may be used.

FIG. 17 is a conceptual diagram illustrating an example mobile device system in which one or more techniques of this disclosure may be used. In the example of FIG. 17, a mobile device 1700, such as a mobile phone or tablet computer, includes a range-finding system, such as a LIDAR system, that detects positions of points on objects 1702 in an environment of mobile device 1700. A data source of mobile device 1700 may use the signals generated by the depth detection sensor to generate a point cloud representation of objects 1702. Mobile device 1700 may include a G-PCC encoder (e.g., G-PCC encoder 200 of FIG. 1) that is configured to encode the point cloud to generate bitstreams 1704. In the example of FIG. 17, mobile device 1700 may transmit bitstreams to a remote device 1706, such as a server system or other mobile device. Remote device 1706 may decode bitstreams 1704 to reconstruct the point cloud. Remote device 1706 may use the point cloud for various purposes. For example, remote device 1706 may use the point cloud to generate a map of environment of mobile device 1700. For instance, remote device 1706 may generate a map of an interior of a building based on the reconstructed point cloud. In another example, remote device 1706 may generate imagery (e.g., computer graphics) based on the point cloud. For instance, remote device 1706 may use points of the point cloud as vertices of polygons and use color attributes of the points as the basis for shading the polygons. In some examples, remote device 1706 may use the reconstructed point cloud for facial recognition or other security applications.

The techniques of this disclosure may further reduce the number of bits in bitstreams 1704. For instance, determining a context index based on an intersection of a laser beam and a node, and using a context indicated by the context index for arithmetic coding of a vertical plane position or a vertical point position offset, may further reduce the number of bits in bitstreams 1704.

Examples in the various aspects of this disclosure may be used individually or in any combination.

The following is a non-limiting list of aspects that may be in accordance with one or more techniques of this disclosure.

Aspect 1A: A method of processing a point cloud includes coding a vertical plane position of a planar mode in a node of an octree that represents 3-dimensional positions of points in the point cloud, wherein coding the vertical plane position of the planar mode comprises: determining a laser index of a laser candidate in a set of laser candidates, wherein the determined laser index indicates a position of a laser beam that intersects the node; determining a context index based on an intersection of the laser beam and the node; and arithmetically coding the vertical plane position of the planar mode using a context indicated by the determined context index.

Aspect 2A: The method of aspect 1A, wherein determining the context index comprises determining the context index based on whether the laser beam is positioned above or below a marker point, wherein the marker point is a center of the node.

Aspect 3A: The method of aspect 1A, wherein determining the context index comprises determining the context index based on whether the laser beam is positioned above a first distance threshold, below a second distance threshold, or between the first and second distance thresholds.

Aspect 4A: The method of aspect 1A, wherein determining the context index comprises determining the context index based on whether the laser beam is positioned above a first distance threshold, between the first distance threshold and a second distance threshold, between the second distance threshold and a third distance threshold, or below the third distance threshold.

Aspect 5A: A method of processing a point cloud includes coding a vertical point position offset within a node of an octree that represents 3-dimensional positions of points in the point cloud, wherein coding the vertical point position offset comprises: determining a laser index of a laser candidate in a set of laser candidates, wherein the determined laser index indicates a position of a laser beam that intersects the node; determining a context index based on an intersection of the laser beam and the node; and arithmetically coding bins of the vertical point position offset using a context indicated by the determined context index.

Aspect 6A: The method of aspect 5A, wherein determining the context index comprises determining the context index based on whether the laser beam is positioned above or below a marker point, wherein the marker point is a center of the node.

Aspect 7A: The method of aspect 5A, wherein determining the context index comprises determining the context index based on whether the laser beam is positioned above a first distance threshold, below a second distance threshold, or between the first and second distance thresholds.

Aspect 8A: The method of aspect 5A, wherein determining the context index comprises determining the context index based on whether the laser beam is positioned above a first distance threshold, between the first distance threshold and a second distance threshold, between the second distance threshold and a third distance threshold, or below the third distance threshold.

Aspect 9A: A method of processing a point cloud includes coding a syntax element having a first value, wherein the first value plus a second value indicates a number of lasers, wherein the second value is a minimum number of lasers.

Aspect 10A: The method of aspect 9A, wherein the syntax element is a first syntax element, the method further includes determining a laser index of a laser candidate in a set of laser candidates, wherein the set of laser candidates has the number of lasers, and the determined laser index indicates a position of a laser beam that intersects a node of an octree that represents 3-dimensional positions of points in the point cloud; determining a context index based on an intersection of the laser beam and the node; and arithmetically coding bins of a second syntax element using a context indicated by the determined context index.

Aspect 11A: A method of processing a point cloud includes determining a laser index of a laser candidate in a set of laser candidates, wherein the determined laser index indicates a position of a laser beam that intersects a node of an octree that represents positions of 3-dimensional positions of points in the point cloud; determining a context index based on an intersection of the laser beam and the node using an angular mode; and arithmetically coding bins of a second syntax element using a context indicated by the determined context index.

Aspect 12A: A method of processing a point cloud includes signaling, for each laser of the set of laser candidates, a corresponding laser angle and a corresponding laser offset.

Aspect 13A: The method of aspect 12A, further comprising the methods of any of aspects 1A-11A.

Aspect 14A: The method of any of aspects 1A-13A, further comprising generating the point cloud.

Aspect 15A: A device for processing a point cloud, the device comprising one or more means for performing the method of any of aspects 1A-14A.

Aspect 16A: The device of aspect 15A, wherein the one or more means comprise one or more processors implemented in circuitry.

Aspect 17A: The device of any of aspects 15A or 16A, further comprising a memory to store the data representing the point cloud.

Aspect 18A: The device of any of aspects 15A-17A, wherein the device comprises a decoder.

Aspect 19A: The device of any of aspects 15A-18A, wherein the device comprises an encoder.

Aspect 20A: The device of any of aspects 15A-19A, further comprising a device to generate the point cloud.

Aspect 21A: The device of any of aspects 15A-20A, further comprising a display to present imagery based on the point cloud.

Aspect 22A: A computer-readable storage medium having stored thereon instructions that, when executed, cause one or more processors to perform the method of any of aspects 1A-14A.

Aspect 1B: A device for decoding point cloud data includes a memory to store the point cloud data; and one or more processors coupled to the memory and implemented in circuitry, the one or more processors configured to: obtain a bitstream that includes an arithmetically encoded syntax element indicating a vertical point position offset within a node of a tree that represents 3-dimensional positions of points in a point cloud represented by the point cloud data; and decode the vertical point position offset, wherein the one or more processors are configured such that, as part of decoding the vertical point position offset, the one or more processors: determine a laser index of a laser candidate in a set of laser candidates, wherein the determined laser index indicates a laser beam that intersects the node; determine a context index based on whether the laser beam is above a first distance threshold, between the first distance threshold and a second distance threshold, between the second distance threshold and a third distance threshold, or below the third distance threshold; and arithmetically decode a bin of the vertical point position offset using a context indicated by the determined context index.

Aspect 2B: The device of aspect 1B, wherein the one or more processors are configured to, as part of determining the context index: determine a laser difference angle for an interval corresponding to the bin of the vertical point position offset by subtracting a tangent of an angle of a line passing through a midpoint of the node from a tangent of an angle of the interval; determine a top angle difference by subtracting a shift value from the laser difference angle for the interval; and determine a bottom angle difference by adding the shift value to the laser difference angle for the interval.

Aspect 3B: The device of aspect 2B, wherein the one or more processors are configured to, as part of determining the context index: perform a first comparison that determines whether the laser difference angle for the interval is greater than or equal to 0; set the context index to 0 or 1 based on whether the laser difference angle for the interval is greater than or equal to 0; perform a second comparison that determines whether the top angle difference is greater than or equal to 0, wherein the laser beam is above the first distance threshold when the top angle difference is greater than or equal to 0; perform a third comparison that determines whether the bottom angle difference is less than 0, wherein the laser beam is below the third distance threshold when the bottom angle difference is less than 0; and increment the context index by 2 based on the top angle difference being greater than or equal to 0 or based on the bottom angle difference being less than 0.

Aspect 4B: The device of any of aspects 1B through 3B, wherein the one or more processors are further configured to reconstruct the point cloud, and wherein the one or more processors are configured to, as part of reconstructing the point cloud, determine positions of one or more points of the point cloud based on the vertical point position offset.

Aspect 5B: The device of aspect 4B, wherein the one or more processors are further configured to generate a map of an interior of a building based on the reconstructed point cloud.

Aspect 6B: The device of any of aspects 4B and 5B, wherein the one or more processors are further configured to perform an autonomous navigation operation based on the reconstructed point cloud.

Aspect 7B: The device of any of aspects 4B through 6B, wherein the one or more processors are further configured to generate computer graphics based on the reconstructed point cloud.

Aspect 8B: The device of any of aspects 4B through 7B, wherein the one or more processors are configured to: determine a position of a virtual object based on the reconstructed point cloud; and generate an extended reality (XR) visualization in which the virtual object is at the determined position.

Aspect 9B: The device of any of aspects 1B through 8B, wherein the device is one of a mobile phone or tablet computer.

Aspect 10B: The device of any of aspects 1B through 9B, wherein the device is a vehicle.

Aspect 11B: The device of any of aspects 1B through 10B, wherein the device is an extended reality device.

Aspect 12B: The device of any of aspects 1B through 11B, further comprising a display to present imagery based on the point cloud.

Aspect 13B: A device for encoding point cloud data includes a memory to store the point cloud data; and one or more processors coupled to the memory and implemented in circuitry, the one or more processors configured to: encode a vertical point position offset within a node of a tree that represents 3-dimensional positions of points in a point cloud represented by the point cloud data, wherein the one or more processors are configured to, as part of encoding the vertical point position offset: determine a laser index of a laser candidate in a set of laser candidates, wherein the determined laser index indicates a laser beam that intersects the node; determine a context index based on whether the laser beam is above a first distance threshold, between the first distance threshold and a second distance threshold, between the second distance threshold and a third distance threshold, or below the third distance threshold; and arithmetically encode the bin of the vertical point position offset using a context indicated by the determined context index.

Aspect 14B: The device of aspect 13B, wherein the one or more processors are configured to, as part of determining the context index: determine a laser difference angle for an interval corresponding to the bin of the vertical point position offset by subtracting a tangent of an angle of a line passing through a midpoint of the node from a tangent of an angle of the interval; determine a top angle difference by subtracting a shift value from the laser difference angle for the interval; and determine a bottom angle difference by adding the shift value to the laser difference angle for the interval.

Aspect 15B: The device of aspect 14B, wherein the one or more processors are configured to, as part of determining the context index: perform a first comparison that determines whether the laser difference angle for the interval is greater than or equal to 0; set the context index to 0 or 1 based on whether the laser difference angle for the interval is greater than or equal to 0; perform a second comparison that determines whether the top angle difference is greater than or equal to 0, wherein the laser beam is above the first distance threshold when the top angle difference is greater than or equal to 0; perform a third comparison that determines whether the bottom angle difference is less than 0, wherein the laser beam is below the third distance threshold when the bottom angle difference is less than 0; and increment the context index by 2 based on the top angle difference being greater than or equal to 0 or based on the bottom angle difference being less than 0.

Aspect 16B: The device of any of aspects 13B through 15B, wherein the one or more processors are further configured to generate the point cloud.

Aspect 17B: The device of aspect 16B, wherein the one or more processors are configured to, as part of generating the point cloud, generate the point cloud based on signals from a LIDAR apparatus.

Aspect 18B: The device of any of aspects 13B through 17B, wherein the device is one of a mobile phone or tablet computer.

Aspect 19B: The device of any of aspects 13B through 18B, wherein the device is a vehicle.

Aspect 20B: The device of any of aspects 13B through 19B, wherein the device is an extended reality device.

Aspect 21B: The device of any of aspects 13B through 20B, wherein the device comprises an interface configured to transmit encoded point cloud data.

Aspect 22B: The device of any of aspects 13B through 22B, further comprising a display to present imagery based on the point cloud.

Aspect 23B: A method of decoding point cloud data includes obtaining a bitstream that includes an arithmetically encoded syntax element indicating a vertical point position offset within a node of a tree that represents 3-dimensional positions of points in a point cloud represented by the point cloud data; and decoding the vertical point position offset, wherein decoding the vertical point position offset comprises: determining a laser index of a laser candidate in a set of laser candidates, wherein the determined laser index indicates a laser beam that intersects the node; determining a context index based on whether the laser beam is above a first distance threshold, between the first distance threshold and a second distance threshold, between the second distance threshold and a third distance threshold, or below the third distance threshold; and arithmetically decoding a bin of the vertical point position offset using a context indicated by the determined context index.

Aspect 24B: The method of aspect 23B, wherein determining the context index comprises: determining a laser difference angle for an interval corresponding to the bin of the vertical point position offset by subtracting a tangent of an angle of a line passing through a midpoint of the node from a tangent of an angle of the interval; determining a top angle difference by subtracting a shift value from the laser difference angle for the interval; and determining a bottom angle difference by adding the shift value to the laser difference angle for the interval.

Aspect 25B: The method of aspect 24B, determining the context index comprises: performing a first comparison that determines whether the laser difference angle for the interval is greater than or equal to 0; setting the context index to 0 or 1 based on whether the laser difference angle for the interval is greater than or equal to 0; performing a second comparison that determines whether the top angle difference is greater than or equal to 0, wherein the laser beam is above the first distance threshold when the top angle difference is greater than or equal to 0; performing a third comparison that determines whether the bottom angle difference is less than 0, wherein the laser beam is below the third distance threshold when the bottom angle difference is less than 0; and incrementing the context index by 2 based on the top angle difference being greater than or equal to 0 or based on the bottom angle difference being less than 0.

Aspect 26B: A method of encoding point cloud data includes encoding a vertical point position offset within a node of a tree that represents 3-dimensional positions of points in a point cloud represented by the point cloud data, wherein encoding the vertical point position offset comprises: determining a laser index of a laser candidate in a set of laser candidates, wherein the determined laser index indicates a laser beam that intersects the node; determining a context index based on whether the laser beam is above a first distance threshold, between the first distance threshold and a second distance threshold, between the second distance threshold and a third distance threshold, or below the third distance threshold; and arithmetically encoding a bin of the vertical point position offset using a context indicated by the determined context index.

Aspect 27B: The method of aspect 26B, wherein determining the context index comprises: determining a laser difference angle for an interval corresponding to the bin of the vertical point position offset by subtracting a tangent of an angle of a line passing through a midpoint of the node from a tangent of an angle of the interval; determining a top angle difference by subtracting a shift value from the laser difference angle for the interval; and determining a bottom angle difference by adding the shift value to the laser difference angle for the interval.

Aspect 28B: The method of aspect 27B, wherein the one or more processors are configured to, as part of determining the context index: performing a first comparison that determines whether the laser difference angle for the interval is greater than or equal to 0; setting the context index to 0 or 1 based on whether the laser difference angle for the interval is greater than or equal to 0; performing a second comparison that determines whether the top angle difference is greater than or equal to 0, wherein the laser beam is above the first distance threshold when the top angle difference is greater than or equal to 0; performing a third comparison that determines whether the bottom angle difference is less than 0, wherein the laser beam is below the third distance threshold when the bottom angle difference is less than 0; and incrementing the context index by 2 based on the top angle difference being greater than or equal to 0 or based on the bottom angle difference being less than 0.

Aspect 29B: The method of any of aspects 26B through 28B, further comprising generating the point cloud.

Aspect 30B: A device for decoding point cloud data includes means for obtaining a bitstream that includes an arithmetically encoded syntax element indicating a vertical point position offset within a node of a tree that represents 3-dimensional positions of points in a point cloud represented by the point cloud data; and means for decoding the vertical point position offset, wherein the means for decoding the vertical point position offset comprises: means for determining a laser index of a laser candidate in a set of laser candidates, wherein the determined laser index indicates a laser beam that intersects the node; means for determining a context index based on whether the laser beam is above a first distance threshold, between the first distance threshold and a second distance threshold, between the second distance threshold and a third distance threshold, or below the third distance threshold; and means for arithmetically decoding a bin of the vertical point position offset using a context indicated by the determined context index.

Aspect 31B: A device for encoding point cloud data includes means for encoding a vertical point position offset within a node of a tree that represents 3-dimensional positions of points in a point cloud represented by the point cloud data, wherein the means for encoding the vertical point position offset comprises: means for determining a laser index of a laser candidate in a set of laser candidates, wherein the determined laser index indicates a laser beam that intersects the node; means for determining a context index based on whether the laser beam is above a first distance threshold, between the first distance threshold and a second distance threshold, between the second distance threshold and a third distance threshold, or below the third distance threshold; and means for arithmetically encoding a bin of the vertical point position offset using a context indicated by the determined context index.

Aspect 32B: A computer-readable storage medium having stored thereon instructions that, when executed, cause one or more processors to: obtain a bitstream that includes an arithmetically encoded syntax element indicating a vertical point position offset within a node of a tree that represents 3-dimensional positions of points in a point cloud; and decode the vertical point position offset, wherein the instructions that cause the one or more processors to decode the vertical point position offset comprise instructions that, when executed, cause the one or more processors to: determine a laser index of a laser candidate in a set of laser candidates, wherein the determined laser index indicates a laser beam that intersects the node; determine a context index based on whether the laser beam is above a first distance threshold, between the first distance threshold and a second distance threshold, between the second distance threshold and a third distance threshold, or below the third distance threshold; and arithmetically decode a bin of the vertical point position offset using a context indicated by the determined context index.

Aspect 33B: A computer-readable storage medium having stored thereon instructions that, when executed, cause one or more processors to: encode a vertical point position offset within a node of a tree that represents 3-dimensional positions of points in a point cloud, wherein the instructions that cause the one or more processors to encode the vertical point position offset comprise instructions that, when executed, cause the one or more processors to: determine a laser index of a laser candidate in a set of laser candidates, wherein the determined laser index indicates a laser beam that intersects the node; determine a context index based on whether the laser beam is above a first distance threshold, between the first distance threshold and a second distance threshold, between the second distance threshold and a third distance threshold, or below the third distance threshold; and arithmetically encode a bin of the vertical point position offset using a context indicated by the determined context index.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A device for decoding point cloud data, the device comprising:
    a memory to store the point cloud data; and
    one or more processors coupled to the memory and implemented in circuitry, the one or more processors configured to:
        obtain a bitstream that includes an arithmetically encoded syntax element indicating a vertical point position offset within a node of a tree that represents 3-dimensional positions of points in a point cloud represented by the point cloud data; and decode the vertical point position offset, wherein the one or more processors are configured such that, as part of decoding the vertical point position offset, the one or more processors:

determine a laser index of a laser candidate in a set of laser candidates, wherein the determined laser index indicates a laser beam that intersects the node;

determine a context index based on whether the laser beam is above a first distance threshold, between the first distance threshold and a second distance threshold, between the second distance threshold and a third distance threshold, or below the third distance threshold; and arithmetically decode a bin of the vertical point position offset using a context indicated by the determined context index.

2. The device of claim 1, wherein the one or more processors are configured to, as part of determining the context index:

determine a laser difference angle for an interval corresponding to the bin of the vertical point position offset by subtracting a tangent of an angle of a line passing through a midpoint of the node from a tangent of an angle of the interval;

determine a top angle difference by subtracting a shift value from the laser difference angle for the interval; and determine a bottom angle difference by adding the shift value to the laser difference angle for the interval.

3. The device of claim 2, wherein the one or more processors are configured to, as part of determining the context index:

perform a first comparison that determines whether the laser difference angle for the interval is greater than or equal to 0;

set the context index to 0 or 1 based on whether the laser difference angle for the interval is greater than or equal to 0;

perform a second comparison that determines whether the top angle difference is greater than or equal to 0, wherein the laser beam is above the first distance threshold when the top angle difference is greater than or equal to 0;

perform a third comparison that determines whether the bottom angle difference is less than 0, wherein the laser beam is below the third distance threshold when the bottom angle difference is less than 0; and increment the context index by 2 based on the top angle difference being greater than or equal to 0 or based on the bottom angle difference being less than 0.

4. The device of claim 1, wherein the one or more processors are further configured to reconstruct the point cloud, and wherein the one or more processors are configured to, as part of reconstructing the point cloud, determine positions of one or more points of the point cloud based on the vertical point position offset.

5. The device of claim 4, wherein the one or more processors are further configured to generate a map of an interior of a building based on the reconstructed point cloud.

6. The device of claim 4, wherein the one or more processors are further configured to perform an autonomous navigation operation based on the reconstructed point cloud.

7. The device of claim 4, wherein the one or more processors are further configured to generate computer graphics based on the reconstructed point cloud.

8. The device of claim 4, wherein the one or more processors are configured to:

determine a position of a virtual object based on the reconstructed point cloud; and generate an extended reality (XR) visualization in which the virtual object is at the determined position.

9. The device of claim 1, wherein the device is one of a mobile phone or tablet computer.

10. The device of claim 1, wherein the device is a vehicle.

11. The device of claim 1, wherein the device is an extended reality device.

12. The device of claim 1, further comprising a display to present imagery based on the point cloud.

13. A device for encoding point cloud data, the device comprising:

a memory to store the point cloud data; and one or more processors coupled to the memory and implemented in circuitry, the one or more processors configured to:

encode a vertical point position offset within a node of a tree that represents 3-dimensional positions of points in a point cloud represented by the point cloud data, wherein the one or more processors are configured to, as part of encoding the vertical point position offset:

determine a laser index of a laser candidate in a set of laser candidates, wherein the determined laser index indicates a laser beam that intersects the node;

determine a context index based on whether the laser beam is above a first distance threshold, between the first distance threshold and a second distance threshold, between the second distance threshold and a third distance threshold, or below the third distance threshold; and arithmetically encode a bin of the vertical point position offset using a context indicated by the determined context index.

14. The device of claim 13, wherein the one or more processors are configured to, as part of determining the context index:

determine a laser difference angle for an interval corresponding to the bin of the vertical point position offset by subtracting a tangent of an angle of a line passing through a midpoint of the node from a tangent of an angle of the interval;

determine a top angle difference by subtracting a shift value from the laser difference angle for the interval; and determine a bottom angle difference by adding the shift value to the laser difference angle for the interval.

15. The device of claim 14, wherein the one or more processors are configured to, as part of determining the context index:

perform a first comparison that determines whether the laser difference angle for the interval is greater than or equal to 0;

set the context index to 0 or 1 based on whether the laser difference angle for the interval is greater than or equal to 0;

perform a second comparison that determines whether the top angle difference is greater than or equal to 0, wherein the laser beam is above the first distance threshold when the top angle difference is greater than or equal to 0;

perform a third comparison that determines whether the bottom angle difference is less than 0, wherein the laser beam is below the third distance threshold when the bottom angle difference is less than 0; and increment the context index by 2 based on the top angle difference being greater than or equal to 0 or based on the bottom angle difference being less than 0.

16. The device of claim 13, wherein the one or more processors are further configured to generate the point cloud.

17. The device of claim 16, wherein the one or more processors are configured to, as part of generating the point cloud, generate the point cloud based on signals from a LIDAR apparatus.

18. The device of claim 13, wherein the device is one of a mobile phone or tablet computer.

19. The device of claim 13, wherein the device is a vehicle.

20. The device of claim 13, wherein the device is an extended reality device.

21. The device of claim 13, wherein the device comprises an interface configured to transmit encoded point cloud data.

22. The device of claim 13, further comprising a display to present imagery based on the point cloud.

23. A method of decoding point cloud data, the method comprising:

obtaining a bitstream that includes an arithmetically encoded syntax element indicating a vertical point position offset within a node of a tree that represents 3-dimensional positions of points in a point cloud represented by the point cloud data; and decoding the vertical point position offset, wherein decoding the vertical point position offset comprises:

determining a laser index of a laser candidate in a set of laser candidates, wherein the determined laser index indicates a laser beam that intersects the node;

determining a context index based on whether the laser beam is above a first distance threshold, between the first distance threshold and a second distance threshold, between the second distance threshold and a third distance threshold, or below the third distance threshold; and arithmetically decoding a bin of the vertical point position offset using a context indicated by the determined context index.

24. The method of claim 23, wherein determining the context index comprises:

determining a laser difference angle for an interval corresponding to the bin of the vertical point position offset by subtracting a tangent of an angle of a line passing through a midpoint of the node from a tangent of an angle of the interval;

determining a top angle difference by subtracting a shift value from the laser difference angle for the interval; and determining a bottom angle difference by adding the shift value to the laser difference angle for the interval.

25. The method of claim 24, determining the context index comprises:

performing a first comparison that determines whether the laser difference angle for the interval is greater than or equal to 0;

setting the context index to 0 or 1 based on whether the laser difference angle for the interval is greater than or equal to 0;

performing a second comparison that determines whether the top angle difference is greater than or equal to 0, wherein the laser beam is above the first distance threshold when the top angle difference is greater than or equal to 0;

performing a third comparison that determines whether the bottom angle difference is less than 0, wherein the laser beam is below the third distance threshold when the bottom angle difference is less than 0; and incrementing the context index by 2 based on the top angle difference being greater than or equal to 0 or based on the bottom angle difference being less than 0.

26. A method of encoding point cloud data, the method comprising:

encoding a vertical point position offset within a node of a tree that represents 3-dimensional positions of points in a point cloud represented by the point cloud data, wherein encoding the vertical point position offset comprises:

determining a laser index of a laser candidate in a set of laser candidates, wherein the determined laser index indicates a laser beam that intersects the node;

determining a context index based on whether the laser beam is above a first distance threshold, between the first distance threshold and a second distance threshold, between the second distance threshold and a third distance threshold, or below the third distance threshold; and arithmetically encoding a bin of the vertical point position offset using a context indicated by the determined context index.

27. The method of claim 26, wherein determining the context index comprises:

determining a laser difference angle for an interval corresponding to the bin of the vertical point position offset by subtracting a tangent of an angle of a line passing through a midpoint of the node from a tangent of an angle of the interval;

determining a top angle difference by subtracting a shift value from the laser difference angle for the interval; and determining a bottom angle difference by adding the shift value to the laser difference angle for the interval.

28. The method of claim 27, wherein determining the context index comprises:

performing a first comparison that determines whether the laser difference angle for the interval is greater than or equal to 0;

setting the context index to 0 or 1 based on whether the laser difference angle for the interval is greater than or equal to 0;

performing a second comparison that determines whether the top angle difference is greater than or equal to 0, wherein the laser beam is above the first distance threshold when the top angle difference is greater than or equal to 0;

performing a third comparison that determines whether the bottom angle difference is less than 0, wherein the laser beam is below the third distance threshold when the bottom angle difference is less than 0; and incrementing the context index by 2 based on the top angle difference being greater than or equal to 0 or based on the bottom angle difference being less than 0.

29. The method of claim 26, further comprising generating the point cloud.

30. A device for decoding point cloud data, the device comprising:
- means for obtaining a bitstream that includes an arithmetically encoded syntax element indicating a vertical point position offset within a node of a tree that represents 3-dimensional positions of points in a point cloud represented by the point cloud data; and
- means for decoding the vertical point position offset, wherein the means for decoding the vertical point position offset comprises:
  - means for determining a laser index of a laser candidate in a set of laser candidates, wherein the determined laser index indicates a laser beam that intersects the node;
  - means for determining a context index based on whether the laser beam is above a first distance threshold, between the first distance threshold and a second distance threshold, between the second distance threshold and a third distance threshold, or below the third distance threshold; and
  - means for arithmetically decoding a bin of the vertical point position offset using a context indicated by the determined context index.

31. A device for encoding point cloud data, the device comprising:
- means for encoding a vertical point position offset within a node of a tree that represents 3-dimensional positions of points in a point cloud represented by the point cloud data, wherein the means for encoding the vertical point position offset comprises:
  - means for determining a laser index of a laser candidate in a set of laser candidates, wherein the determined laser index indicates a laser beam that intersects the node;
  - means for determining a context index based on whether the laser beam is above a first distance threshold, between the first distance threshold and a second distance threshold, between the second distance threshold and a third distance threshold, or below the third distance threshold; and
  - means for arithmetically encoding a bin of the vertical point position offset using a context indicated by the determined context index.

32. A non-transitory computer-readable storage medium having stored thereon instructions that, when executed, cause one or more processors to:
- obtain a bitstream that includes an arithmetically encoded syntax element indicating a vertical point position offset within a node of a tree that represents 3-dimensional positions of points in a point cloud; and
- decode the vertical point position offset, wherein the instructions that cause the one or more processors to decode the vertical point position offset comprise instructions that, when executed, cause the one or more processors to:
  - determine a laser index of a laser candidate in a set of laser candidates, wherein the determined laser index indicates a laser beam that intersects the node;
  - determine a context index based on whether the laser beam is above a first distance threshold, between the first distance threshold and a second distance threshold, between the second distance threshold and a third distance threshold, or below the third distance threshold; and
  - arithmetically decode a bin of the vertical point position offset using a context indicated by the determined context index.

33. A non-transitory computer-readable storage medium having stored thereon instructions that, when executed, cause one or more processors to:
- encode a vertical point position offset within a node of a tree that represents 3-dimensional positions of points in a point cloud, wherein the instructions that cause the one or more processors to encode the vertical point position offset comprise instructions that, when executed, cause the one or more processors to:
  - determine a laser index of a laser candidate in a set of laser candidates, wherein the determined laser index indicates a laser beam that intersects the node;
  - determine a context index based on whether the laser beam is above a first distance threshold, between the first distance threshold and a second distance threshold, between the second distance threshold and a third distance threshold, or below the third distance threshold; and
  - arithmetically encode a bin of the vertical point position offset using a context indicated by the determined context index.

* * * * *